US012695871B2

(12) United States Patent
Nam et al.

(10) Patent No.: US 12,695,871 B2
(45) Date of Patent: Jul. 28, 2026

(54) VIDEO ENCODING/DECODING METHOD AND DEVICE USING SEGMENTATION LIMITATION FOR CHROMA BLOCK, AND METHOD FOR TRANSMITTING BITSTREAM

(71) Applicant: Nokia Technologies Oy, Espoo (FI)

(72) Inventors: Jung Hak Nam, Seoul (KR); Hyeong Moon Jang, Seoul (KR); Nae Ri Park, Seoul (KR)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 18/775,661

(22) Filed: Jul. 17, 2024

(65) Prior Publication Data

US 2025/0030851 A1     Jan. 23, 2025

Related U.S. Application Data

(63) Continuation of application No. 17/437,349, filed as application No. PCT/KR2020/003559 on Mar. 13, 2020, now Pat. No. 12,075,043.

(Continued)

(51) Int. Cl.
*H04N 7/12* (2006.01)
*H04N 19/119* (2014.01)
(Continued)

(52) U.S. Cl.
CPC ......... *H04N 19/119* (2014.11); *H04N 19/137* (2014.11); *H04N 19/159* (2014.11);
(Continued)

(58) Field of Classification Search
CPC .. H04N 19/119; H04N 19/137; H04N 19/159; H04N 19/176; H04N 19/186;
(Continued)

(56) References Cited

U.S. PATENT DOCUMENTS 10,609,403 B2 * 3/2020 Xu .......................... H04N 19/44
10,779,004 B2 * 9/2020 Huang ................. H04N 19/119
(Continued)

FOREIGN PATENT DOCUMENTS

CN     107948661 A     4/2018
CN     110115032 A     8/2019
(Continued)

OTHER PUBLICATIONS

Zhao et al., "CE1-related: Constrained chroma block partitioning", Joint Video Experts Team (JVET) of ITU-T SG 16 WP 3 and ISO/IEC JTC 1/SC 29/WG 11, JVET-L0372-v2, 12th Meeting: Macao, CN, Oct. 3-12, 2018.
(Continued)

*Primary Examiner* — Gims S Philippe

(74) *Attorney, Agent, or Firm* — ALSTON & BIRD LLP

(57) ABSTRACT

An image encoding/decoding method and apparatus are provided. An image decoding method performed by an image decoding apparatus includes determining whether predetermined splitting is allowed for a current block based on a size of the current block, obtaining information on splitting of the current block based on whether the predetermined splitting is allowed, splitting the current block based on the information on splitting of the current block, and decoding the current block. Whether the predetermined splitting is allowed may be determined based on whether a width or height of the current block is a predetermined sample length.

12 Claims, 21 Drawing Sheets

Related U.S. Application Data

(60) Provisional application No. 62/818,087, filed on Mar. 13, 2019.

(51) Int. Cl.

| | |
|---|---|
| *H04N 19/137* | (2014.01) |
| *H04N 19/159* | (2014.01) |
| *H04N 19/176* | (2014.01) |
| *H04N 19/186* | (2014.01) |
| *H04N 19/593* | (2014.01) |
| *H04N 19/96* | (2014.01) |

(52) U.S. Cl.
CPC ......... *H04N 19/176* (2014.11); *H04N 19/186* (2014.11); *H04N 19/593* (2014.11); *H04N 19/96* (2014.11)

(58) Field of Classification Search
CPC .... H04N 19/593; H04N 19/96; H04N 19/136; H04N 19/109; H04N 19/122; H04N 19/132; H04N 19/503
See application file for complete search history.

(56) References Cited

U.S. PATENT DOCUMENTS

| | | | |
|---|---|---|---|
| 2015/0139296 A1 | 5/2015 | Yu et al. | |
| 2017/0142418 A1 | 5/2017 | Li et al. | |
| 2018/0103268 A1 | 4/2018 | Huang et al. | |
| 2020/0014946 A1 | 1/2020 | Xu et al. | |
| 2020/0036992 A1 | 1/2020 | Lim et al. | |
| 2020/0077094 A1 | 3/2020 | Poirier et al. | |
| 2020/0154128 A1 | 5/2020 | Lee | |
| 2020/0213590 A1 | 7/2020 | Kim et al. | |
| 2020/0359021 A1* | 11/2020 | Kanoh | H04N 19/463 |
| 2021/0021840 A1 | 1/2021 | Jang et al. | |
| 2021/0021848 A1* | 1/2021 | Nam | H04N 19/132 |
| 2021/0235099 A1* | 7/2021 | Park | H04N 19/176 |
| 2022/0109834 A1* | 4/2022 | Jeong | H04N 19/157 |
| 2022/0345703 A1 | 10/2022 | Moon et al. | |
| 2022/0368902 A1 | 11/2022 | Lee et al. | |
| 2023/0103665 A1 | 4/2023 | Choi et al. | |
| 2024/0357109 A1 | 10/2024 | Lee et al. | |

FOREIGN PATENT DOCUMENTS

| | | |
|---|---|---|
| JP | 2019-201254 A | 11/2019 |
| KR | 10-2017-0021302 A | 2/2017 |
| KR | 10-2018-0033030 A | 4/2018 |
| KR | 10-2018-0046875 A | 5/2018 |
| KR | 2018-0046875 A | 5/2018 |
| WO | 2018/030746 A1 | 2/2018 |
| WO | 2018/065250 A1 | 4/2018 |
| WO | 2018/070788 A1 | 4/2018 |
| WO | 2018/166357 A1 | 9/2018 |
| WO | 2018/177741 A1 | 10/2018 |
| WO | 2018/181448 A1 | 10/2018 |
| WO | 2019/017651 A1 | 1/2019 |
| WO | 2019/045391 A1 | 3/2019 |
| WO | 2020/143684 A1 | 7/2020 |

OTHER PUBLICATIONS

Advisory Action (PTOL-303) Mailed on Mar. 12, 2024 for U.S. Appl. No. 17/437,349, 2 page(s).

B. Bross et al., "Versatile Video Coding (Draft 4)", Joint Video Experts Team (JVET) of ITU-T SG 16 WP 3 and ISO/IEC JTC 1/SC 29/WG 11, Jan. 9-18, 2019, JVET-M1001-v6.
Benjamin Bross et al., "Versatile Video Coding (Draft 3)", JVET-L1001-v6, Joint Video Experts Team (JVET) of ITU-T SG 16 WP 3 and ISO/IEC JTC 1/SC 291WG 11, 12th Meeting: Macao, CN, Oct. 3-12, 2018, see p. 41.
Decision to Grant for Chinese Application No. 202080020415.9 dated Jun. 14, 2024, 4 pages.
Decision to Grant for Japanese Application No. 2021-554726 dated May 7, 2024, 5 pages.
Extended European Search Report for European Application No. 20769888.7 dated Nov. 22, 2022, 7 pages.
Final Rejection Mailed on Jan. 9, 2024 for U.S. Appl. No. 17/437,349, 9 page(s).
First Examination Report for Indian Application No. 202318008544 dated Feb. 7, 2025, 6 pages.
IPEA/409—International Preliminary Report on Patentability Mailed on Sep. 23, 2021 for WO Application No. PCT/KR20/003559, 12 page(s).
J. Chen et al., "Algorithm description for Versatile Video Coding and Test Model 4 (VTM 4)", Joint Video Experts Team (JVET) of ITU-T SG 16 WP 3 and ISO/IEC JTC 1/SC 29/WG 11, Jan. 9-18, 2019, JVET-M1002-v2.
J. Choi et al., "Chroma block size restriction in dual tree intra coding", Joint Video Experts Team (JVET) of ITU-T SG 16 WP 3 and ISO/IEC JTC 1/SC 29/WG 11, Jul. 3-12, 2019, JVET-O0398.
Jianle Chen, et al., "Algorithm description for Versatile Video Coding and Test Model 3 (VTM 3)", Joint Video Experts Team (JVET) of ITU-T SG 16 WP 3 and ISO/IEC JTC 1/SC 29/WG 11, 12th Meeting: Macao, CN, Oct. 3-12, 2018, JVET-L1002-v1.
Non-Final Rejection Mailed on Aug. 17, 2023 for U.S. Appl. No. 17/437,349, 7 page(s).
Notice of Allowance and Fees Due (PTOL-85) Mailed on Apr. 18, 2024 for U.S. Appl. No. 17/437,349, 5 page (s).
Notice of Reasons for Refusal for Japanese Application No. 2021-554726 dated Dec. 5, 2023, 6 pages.
Notice of Reasons for Refusal for Japanese Application No. 2021-554726 dated May 30, 2023, 10 pages.
Notice of Reasons for Refusal for Japanese Application No. 2021-554726 dated Nov. 1, 2022, 11 pages.
Notice of Reasons for Refusal for Japanese Application No. 2024-092443 dated Jun. 10, 2025, 11 pages.
Office Action for Chinese Application No. 202080020415.9 dated Jan. 17, 2024, 11 pages.
Office Action for European Application No. 20769888.7 dated Nov. 26, 2025, 10 pages.
Office Action for Korean Application No. 10-2021-7027794 dated Apr. 24, 2024, 10 pages.
Office Action for Vietnamese Application No. 1-2021-06099 dated Sep. 9, 2024, 3 pages.
Outgoing—ISA/210—International Search Report Mailed on Jun. 24, 2020 for WO Application No. PCT/KR20/003559, 5 page(s).
Outgoing Written Opinion of the ISA Mailed on Jun. 24, 2020 for WO Application No. PCT/KR20/003559, 9 page(s).
T. Zhou et al., "Non-CE3: Intra chroma partitioning and prediction restriction", Joint Video Exploration Team (JVET) of ITU-T SG 16 WP 3 and ISO/IEC JTC 1/SC 29/WG 11, Jan. 9-18, 2019, JVET-M0065.
Written Decision on Registration for Korean Application No. 10-2021-7027794 dated Nov. 19, 2024, 6 pages.
First Examination Report for Indian Application No. 202218076782 dated Feb. 24, 2026, 7 pages.
First Examination Report for Indian Application No. 202218076784 dated Feb. 24, 2026, 7 pages.

* cited by examiner

SPLIT_BT_VER     SPLIT_BT_HOR     SPLIT_TT_VER     SPLIT_TT_HOR

Figure 14:
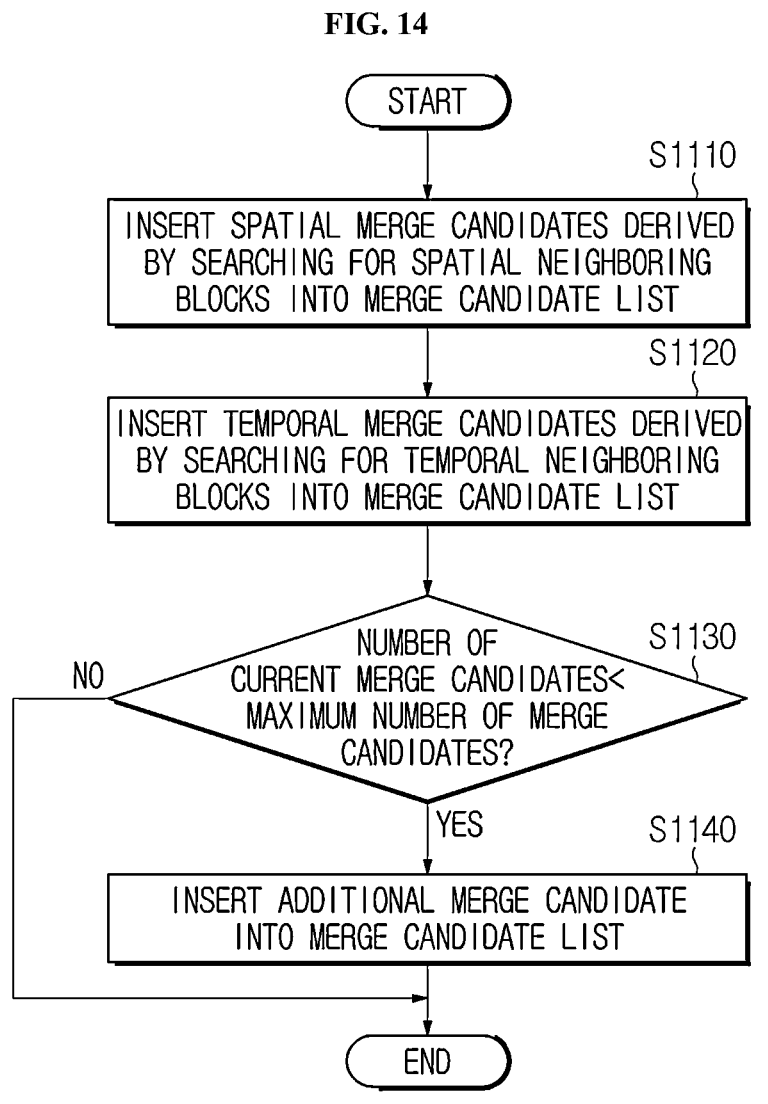

START

S1110

INSERT SPATIAL MERGE CANDIDATES DERIVED
BY SEARCHING FOR SPATIAL NEIGHBORING
BLOCKS INTO MERGE CANDIDATE LIST

S1120

INSERT TEMPORAL MERGE CANDIDATES DERIVED
BY SEARCHING FOR TEMPORAL NEIGHBORING
BLOCKS INTO MERGE CANDIDATE LIST

S1130

NUMBER OF
CURRENT MERGE CANDIDATES<
MAXIMUM NUMBER OF MERGE
CANDIDATES?

NO

YES          S1140

INSERT ADDITIONAL MERGE CANDIDATE
INTO MERGE CANDIDATE LIST

END

FIG. 15

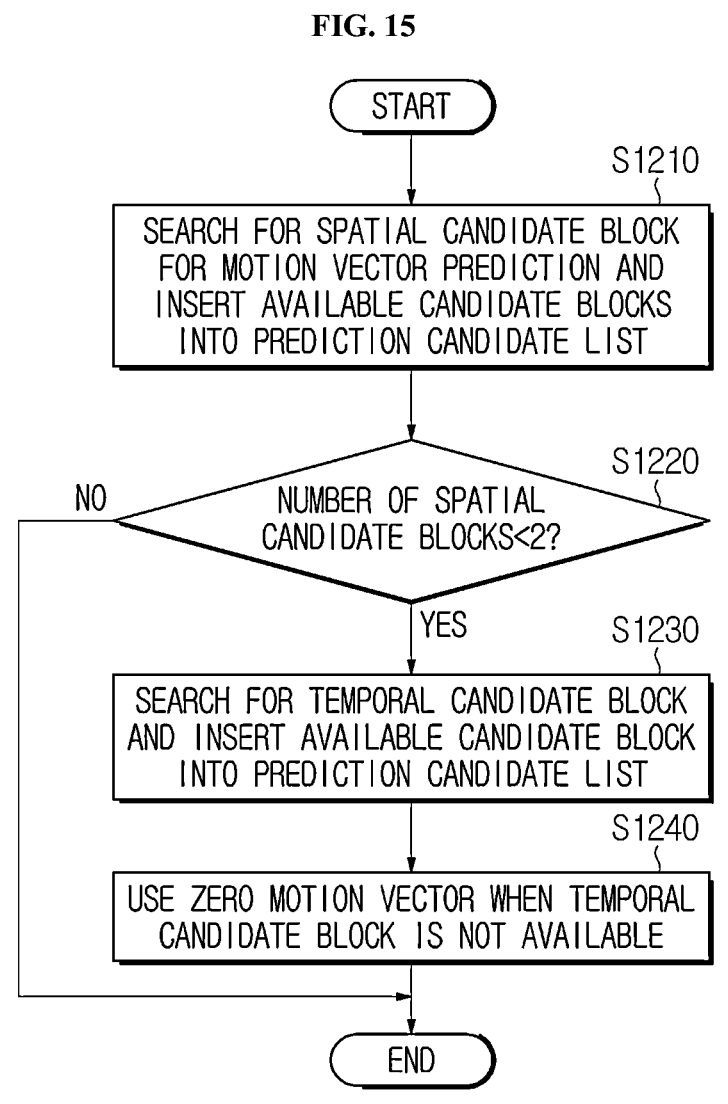

```
                    ┌──────────┐
                    │  START   │
                    └──────────┘
                          │
                          │              S1210
                          ▼
     ┌──────────────────────────────────────────┐
     │   SEARCH FOR SPATIAL CANDIDATE BLOCK      │
     │   FOR MOTION VECTOR PREDICTION AND        │
     │   INSERT AVAILABLE CANDIDATE BLOCKS       │
     │   INTO PREDICTION CANDIDATE LIST          │
     └──────────────────────────────────────────┘
                          │
                          │              S1220
                          ▼
              ╱◇───────────────────◇╲
      NO    ╱    NUMBER OF SPATIAL    ╲
    ◀──────    CANDIDATE BLOCKS<2?      
            ╲                         ╱
              ╲◇───────────────────◇╱
                       │ YES
                       │              S1230
                       ▼
     ┌──────────────────────────────────────────┐
     │   SEARCH FOR TEMPORAL CANDIDATE BLOCK     │
     │   AND INSERT AVAILABLE CANDIDATE BLOCK    │
     │   INTO PREDICTION CANDIDATE LIST          │
     └──────────────────────────────────────────┘
                       │              S1240
                       ▼
     ┌──────────────────────────────────────────┐
     │   USE ZERO MOTION VECTOR WHEN TEMPORAL    │
     │   CANDIDATE BLOCK IS NOT AVAILABLE        │
     └──────────────────────────────────────────┘
                       │
                       ▼
                 ┌──────────┐
                 │   END    │
                 └──────────┘
```

FIG. 16

| mvd_coding( x0, y0, refList ,cpIdx ) { | Descriptor |
|---|---|
|   abs_mvd_greater0_flag[ 0 ] | ae(v) |
|   abs_mvd_greater0_flag[ 1 ] | ae(v) |
|   if( abs_mvd_greater0_flag[ 0 ] ) | |
|     abs_mvd_greater1_flag[ 0 ] | ae(v) |
|   if( abs_mvd_greater0_flag[ 1 ] ) | |
|     abs_mvd_greater1_flag[ 1 ] | ae(v) |
|   if( abs_mvd_greater0_flag[ 0 ] ) { | |
|     if( abs_mvd_greater1_flag[ 0 ] ) | |
|       abs_mvd_minus2[ 0 ] | ae(v) |
|     mvd_sign_flag[ 0 ] | ae(v) |
|   } | |
|   if( abs_mvd_greater0_flag[ 1 ] ) { | |
|     if( abs_mvd_greater1_flag[ 1 ] ) | |
|       abs_mvd_minus2[ 1 ] | ae(v) |
|     mvd_sign_flag[ 1 ] | ae(v) |
|   } | |
| } | |

FIG. 17

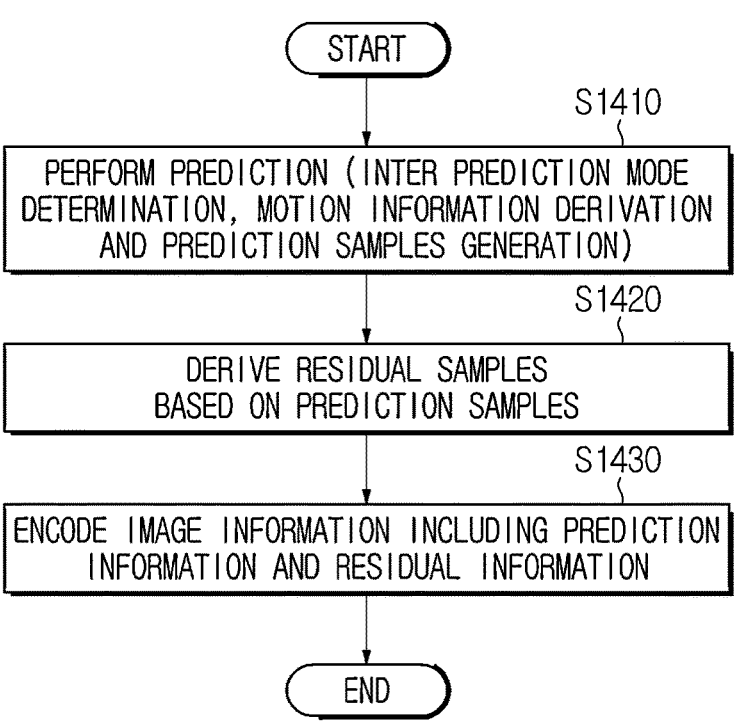

START

S1410

PERFORM PREDICTION (INTER PREDICTION MODE DETERMINATION, MOTION INFORMATION DERIVATION AND PREDICTION SAMPLES GENERATION)

S1420

DERIVE RESIDUAL SAMPLES BASED ON PREDICTION SAMPLES

S1430

ENCODE IMAGE INFORMATION INCLUDING PREDICTION INFORMATION AND RESIDUAL INFORMATION

END

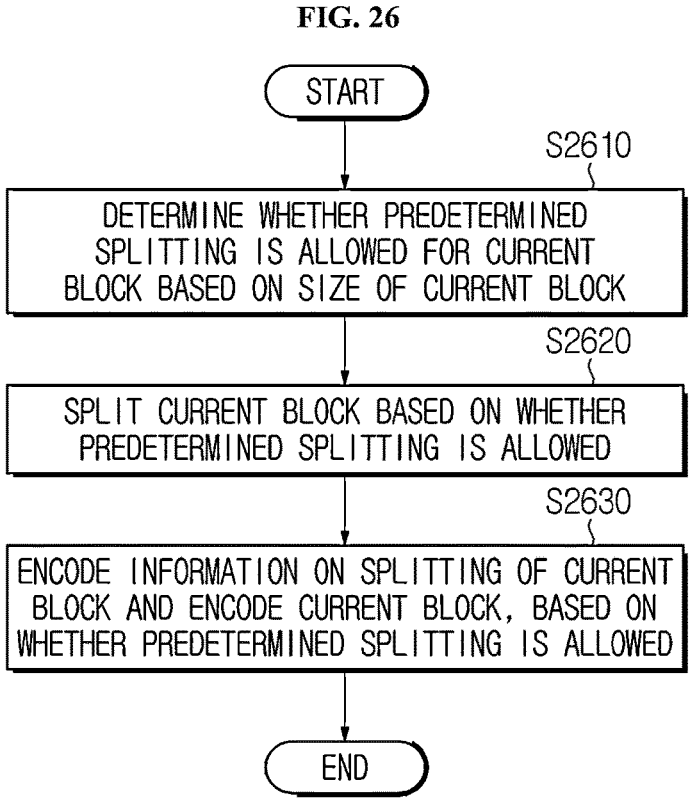

START

S2610

DETERMINE WHETHER PREDETERMINED
SPLITTING IS ALLOWED FOR CURRENT
BLOCK BASED ON SIZE OF CURRENT BLOCK

S2620

SPLIT CURRENT BLOCK BASED ON WHETHER
PREDETERMINED SPLITTING IS ALLOWED

S2630

ENCODE INFORMATION ON SPLITTING OF CURRENT
BLOCK AND ENCODE CURRENT BLOCK, BASED ON
WHETHER PREDETERMINED SPLITTING IS ALLOWED

END

FIG. 27

| coding_tree( x0, y0, cbWidth, cbHeight, qgOnY, qgOnC, cbSubdiv, cqtDepth, mttDepth, depthOffset, partIdx, treeTypeCurr, modeTypeCurr ) { | Descriptor |
|---|---|
| if( ( allowSplitBtVer \|\| allowSplitBtHor \|\| allowSplitTtVer \|\| allowSplitTtHor \|\| allowSplitQT ) && ( x0 + cbWidth <= pic_width_in_luma_samples )         && ( y0 + cbHeight <= pic_height_in_luma_samples ) ) | |
| 2710 ⌐  split_cu_flag | ae(v) |
| ... | ... |
| if( split_cu_flag ) { | |
| if( ( allowSplitBtVer  \|\|  allowSplitBtHor  \|\|  allowSplitTtVer  \|\|  allowSplitTtHor )  &&   allowSplitQT ) | |
| 2720 ⌐  split_qt_flag | ae(v) |
| if( !split_qt_flag ) { | |
| if( ( allowSplitBtHor  \|\|  allowSplitTtHor )  &&  ( allowSplitBtVer  \|\|  allowSplitTtVer ) ) | |
| 2730 ⌐  mtt_split_cu_vertical_flag | ae(v) |
| if( ( allowSplitBtVer  &&  allowSplitTtVer  &&  mtt_split_cu_vertical_flag ) \|\| ( allowSplitBtHor  &&  allowSplitTtHor  &&  !mtt_split_cu_vertical_flag ) ) | |
| 2740 ⌐  mtt_split_cu_binary_flag | ae(v) |
| } | |

FIG. 28

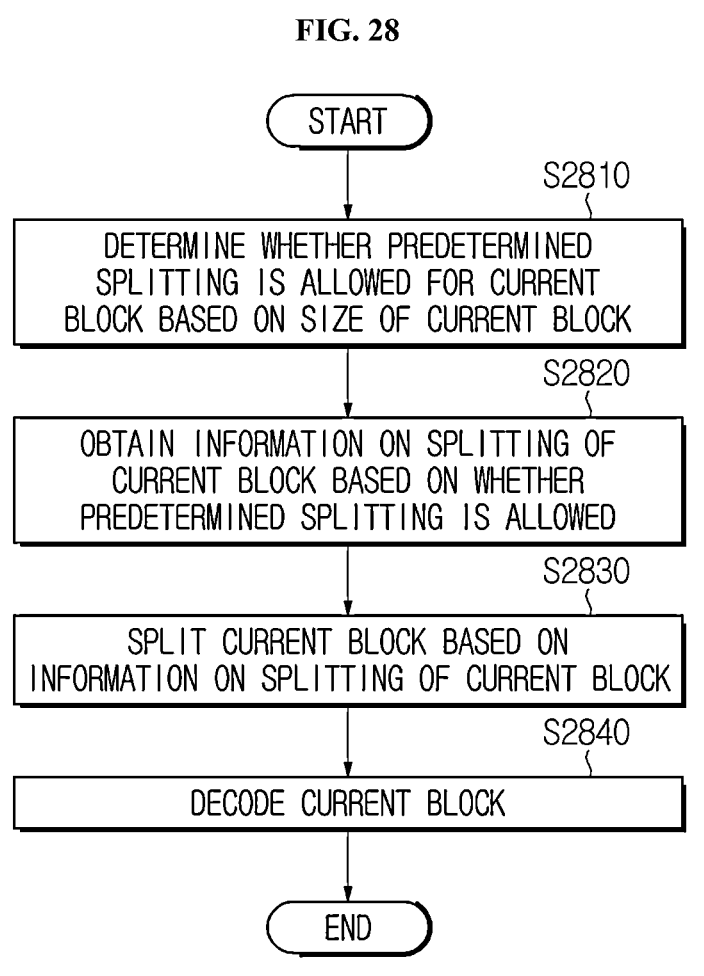

START

S2810

DETERMINE WHETHER PREDETERMINED
SPLITTING IS ALLOWED FOR CURRENT
BLOCK BASED ON SIZE OF CURRENT BLOCK

S2820

OBTAIN INFORMATION ON SPLITTING OF
CURRENT BLOCK BASED ON WHETHER
PREDETERMINED SPLITTING IS ALLOWED

S2830

SPLIT CURRENT BLOCK BASED ON
INFORMATION ON SPLITTING OF CURRENT BLOCK

S2840

DECODE CURRENT BLOCK

END

VIDEO ENCODING/DECODING METHOD AND DEVICE USING SEGMENTATION LIMITATION FOR CHROMA BLOCK, AND METHOD FOR TRANSMITTING BITSTREAM

CROSS-REFERENCE TO RELATED APPLICATIONS

This application is a Continuation of U.S. patent application Ser. No. 17/437,349, filed on Sep. 8, 2021, which is a National Stage of International Application No. PCT/KR2020/003559, filed on Mar. 13, 2020, now Publication Number WO 2020/185045, published Sep. 17, 2020, which claims the benefit of U.S. Provisional Application No. 62/818,087, filed Mar. 13, 2019, the contents of which are all hereby incorporated by reference herein in their entirety.

TECHNICAL FIELD

The present disclosure relates to an image encoding/decoding method and apparatus, and a method of transmitting a bitstream, and, more particularly, to a method and apparatus for encoding/decoding an image using a restriction on splitting of a chroma block, and a method of transmitting a bitstream generated by the image encoding method/apparatus of the present disclosure.

BACKGROUND ART

Recently, demand for high-resolution and high-quality images such as high definition (HD) images and ultra high definition (UHD) images is increasing in various fields. As resolution and quality of image data are improved, the amount of transmitted information or bits relatively increases as compared to existing image data. An increase in the amount of transmitted information or bits causes an increase in transmission cost and storage cost.

Accordingly, there is a need for high-efficient image compression technology for effectively transmitting, storing and reproducing information on high-resolution and high-quality images.

DISCLOSURE

Technical Problem

An object of the present disclosure is to provide an image encoding/decoding method and apparatus with improved encoding/decoding efficiency.

Another object of the present disclosure is to provide a method and apparatus for encoding/decoding an image using restriction on splitting of a chroma block.

Another object of the present disclosure is to provide an image encoding/decoding method and apparatus which do not signal splitting information when a chroma block cannot be split.

Another object of the present disclosure is to provide a method of transmitting a bitstream generated by an image encoding method or apparatus according to the present disclosure.

Another object of the present disclosure is to provide a recording medium storing a bitstream generated by an image encoding method or apparatus according to the present disclosure.

Another object of the present disclosure is to provide a recording medium storing a bitstream received, decoded and used to reconstruct an image by an image decoding apparatus according to the present disclosure.

The technical problems solved by the present disclosure are not limited to the above technical problems and other technical problems which are not described herein will become apparent to those skilled in the art from the following description.

Technical Solution

An image decoding method performed by an image decoding apparatus according to an aspect of the present disclosure may include determining whether predetermined splitting is allowed for a current block based on a size of the current block, obtaining information on splitting of the current block based on whether the predetermined splitting is allowed, splitting the current block based on the information on splitting of the current block, and decoding the current block. Whether the predetermined splitting is allowed may be determined based on whether a width or height of the current block is a predetermined sample length. Here, the current block may be a chroma block split into a dual tree splitting structure.

It may be determined that vertical ternary splitting is not allowed for the current block, when the width of the current block is a predetermined sample length, and it may be determined that horizontal ternary splitting is not allowed for the current block, when the height of the current block is a predetermined sample length. Here, the current block may be a chroma block, and the predetermined sample length may be a length of 8 samples It may be determined that vertical binary splitting is not allowed for the current block, when the width of the current block is a predetermined sample length, and it may be determined that horizontal binary splitting is not allowed for the current block, when the height of the current block is a predetermined sample length. Here, the current block may be a chroma block, and the predetermined sample length may be a length of 4 samples.

The current block may be a chroma block, and the width or height of the current block may be derived based on a width or height of a corresponding luma block and a color format. More specifically, the width or height of the current block may be derived as a value obtained by dividing the width or height of the corresponding luma block by a component ratio between a chroma sample and a luma sample, and the component ratio may be derived based on the color format.

When the predetermined splitting is not allowed for the current block, the information on splitting of the current block may be determined as a value specifying splitting other than the predetermined splitting. The information on splitting of the current block may include splitting type information specifying ternary splitting or binary splitting, the splitting type information may be determined as a value specifying binary splitting, when vertical ternary splitting and horizontal ternary splitting are not allowed for the current block, and the splitting type information may be determined as a value specifying ternary splitting, when vertical binary splitting and horizontal binary splitting are not allowed for the current block.

The information on splitting of the current block may include splitting direction information specifying vertical splitting or horizontal splitting, the splitting direction information may be determined as a value specifying horizontal splitting, when vertical binary splitting and vertical ternary splitting are not allowed for the current block and horizontal binary splitting or horizontal ternary splitting are allowed, and the splitting direction information may be determined as a value specifying vertical splitting, when horizontal binary splitting and horizontal ternary splitting are not allowed for the current block and vertical binary splitting or vertical ternary splitting are allowed.

The image decoding method may further include, when the current block is a chroma block predicted in an IBC mode, splitting a luma block corresponding to the current block into luma subblocks each having a predetermined size, obtaining motion information of the luma subblocks, deriving motion information of subblocks in the current block corresponding to the luma subblocks based on the motion information of the luma subblocks, and performing IBC prediction on the current block based on the derived motion information. Here, the predetermined size of each of the luma subblocks may be 8×8.

An image decoding apparatus according to an aspect of the present disclosure includes a memory and at least one processor. The at least one processor may determine whether predetermined splitting is allowed for a current block based on a size of the current block, obtain information on splitting of the current block based on whether the predetermined splitting is allowed, split the current block based on the information on splitting of the current block, and decode the current block. Whether the predetermined splitting is allowed may be determined based on whether a width or height of the current block is a predetermined sample length.

An image encoding method performed by an image encoding apparatus according to aspect of the present disclosure includes determining whether predetermined splitting is allowed for a current block based on a size of the current block, splitting the current block based on whether the predetermined splitting is allowed, encoding information on splitting of the current block based on whether the predetermined splitting is allowed, and encoding the current block. Whether the predetermined splitting is allowed may be determined based on whether a width or height of the current block is a predetermined sample length.

In addition, a transmission method according to another aspect of the present disclosure may transmit a bitstream generated by the image encoding apparatus or the image encoding method of the present disclosure.

In addition, a computer-readable recording medium according to another aspect of the present disclosure may store the bitstream generated by the image encoding apparatus or the image encoding method of the present disclosure.

The features briefly summarized above with respect to the present disclosure are merely exemplary aspects of the detailed description below of the present disclosure, and do not limit the scope of the present disclosure.

Advantageous Effects

According to the present disclosure, it is possible to provide an image encoding/decoding method and apparatus with improved encoding/decoding efficiency.

According to the present disclosure, it is possible to provide an image encoding/decoding method and apparatus capable of reducing the amount of bitstreams by not signaling splitting information of a chroma block when splitting of a chroma block is restricted.

Also, according to the present disclosure, it is possible to provide a method of transmitting a bitstream generated by an image encoding method or apparatus according to the present disclosure.

Also, according to the present disclosure, it is possible to provide a recording medium storing a bitstream generated by an image encoding method or apparatus according to the present disclosure.

Also, according to the present disclosure, it is possible to provide a recording medium storing a bitstream received, decoded and used to reconstruct an image by an image decoding apparatus according to the present disclosure.

It will be appreciated by persons skilled in the art that that the effects that can be achieved through the present disclosure are not limited to what has been particularly described hereinabove and other advantages of the present disclosure will be more clearly understood from the detailed description.

DESCRIPTION OF DRAWINGS

FIG. 1 is a view schematically showing a video coding system, to which an embodiment of the present disclosure is applicable;

FIG. 2 is a view schematically showing an image encoding apparatus, to which an embodiment of the present disclosure is applicable;

FIG. 6 is a view showing a signaling mechanism of block splitting information in a quadtree with nested multi-type tree structure according to the present disclosure;

FIG. 14 is a view schematically illustrating a merge candidate list construction method according to an embodiment.

FIG. 15 is a view schematically illustrating a motion vector predictor candidate list construction method according to an embodiment.

FIG. 16 is a view illustrating a syntax structure for transmitting MVD from an image encoding apparatus to an image decoding apparatus according to an embodiment.

FIG. 17 is a flowchart illustrating an IBC based video/image encoding method according to an embodiment.

FIG. 24 is a view illustrating a method of determining whether a vertical binary split (SPLIT_BT_VER) is allowed for a current block by a decoding apparatus according to an embodiment.

FIG. 26 is a flowchart illustrating a method of encoding an image by a decoding apparatus according to an embodiment.

FIG. 27 is a view illustrating syntax for a bitstream signaling information on split of a current block according to an embodiment.

FIG. 28 is a flowchart illustrating a method of decoding an image by a decoding apparatus according to an embodiment.

MODE FOR INVENTION

Figure 3:
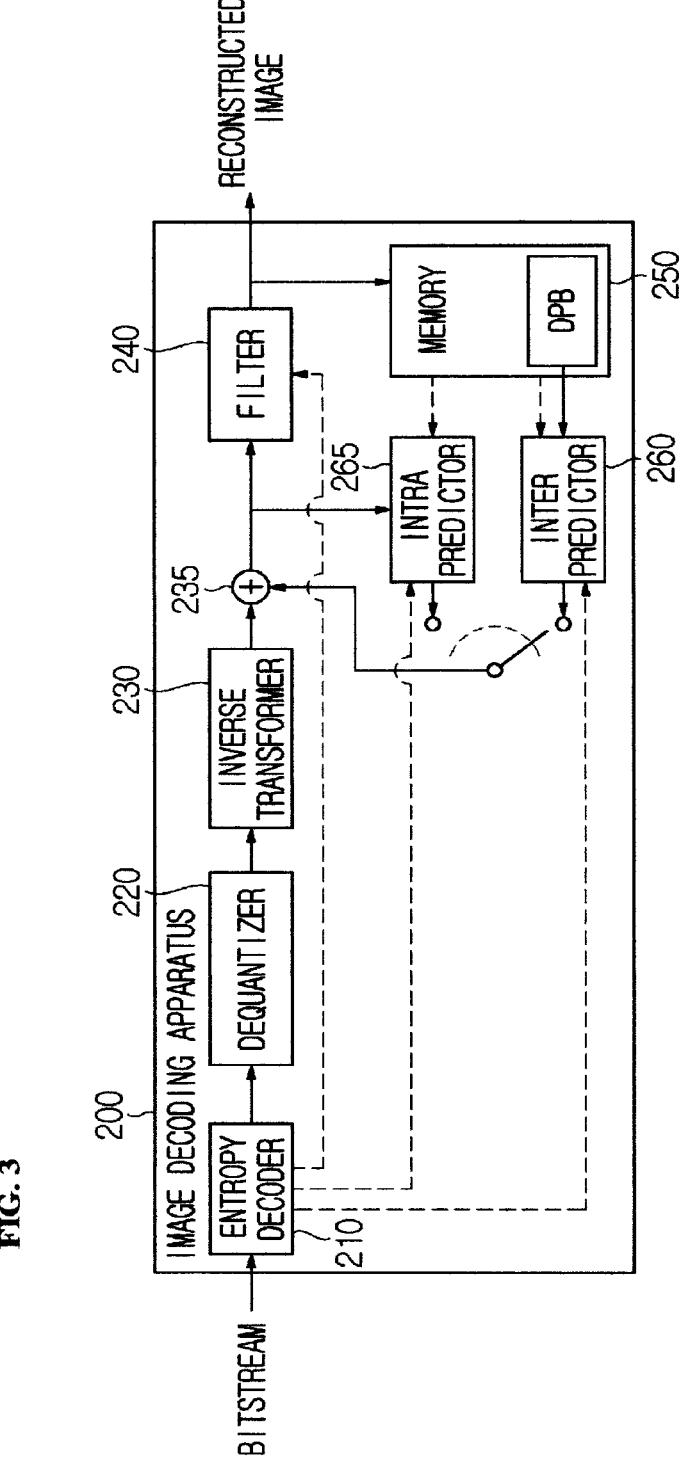
FIG. 3 is a view schematically showing an image decoding apparatus, to which an embodiment of the present disclosure is applicable.

Hereinafter, the embodiments of the present disclosure will be described in detail with reference to the accompanying drawings so as to be easily implemented by those skilled in the art. However, the present disclosure may be implemented in various different forms, and is not limited to the embodiments described herein.

In describing the present disclosure, if it is determined that the detailed description of a related known function or construction renders the scope of the present disclosure unnecessarily ambiguous, the detailed description thereof will be omitted. In the drawings, parts not related to the description of the present disclosure are omitted, and similar reference numerals are attached to similar parts.

In the present disclosure, when a component is "connected", "coupled" or "linked" to another component, it may include not only a direct connection relationship but also an indirect connection relationship in which an intervening component is present. In addition, when a component "includes" or "has" other components, it means that other components may be further included, rather than excluding other components unless otherwise stated.

In the present disclosure, the terms first, second, etc. may be used only for the purpose of distinguishing one component from other components, and do not limit the order or importance of the components unless otherwise stated. Accordingly, within the scope of the present disclosure, a first component in one embodiment may be referred to as a second component in another embodiment, and similarly, a second component in one embodiment may be referred to as a first component in another embodiment.

In the present disclosure, components that are distinguished from each other are intended to clearly describe each feature, and do not mean that the components are necessarily separated. That is, a plurality of components may be integrated and implemented in one hardware or software unit, or one component may be distributed and implemented in a plurality of hardware or software units. Therefore, even if not stated otherwise, such embodiments in which the components are integrated or the component is distributed are also included in the scope of the present disclosure.

In the present disclosure, the components described in various embodiments do not necessarily mean essential components, and some components may be optional components. Accordingly, an embodiment consisting of a subset of components described in an embodiment is also included in the scope of the present disclosure. In addition, embodiments including other components in addition to components described in the various embodiments are included in the scope of the present disclosure.

The present disclosure relates to encoding and decoding of an image, and terms used in the present disclosure may have a general meaning commonly used in the technical field, to which the present disclosure belongs, unless newly defined in the present disclosure.

In the present disclosure, a "picture" generally refers to a unit representing one image in a specific time period, and a slice/tile is a coding unit constituting a part of a picture, and one picture may be composed of one or more slices/tiles. In addition, a slice/tile may include one or more coding tree units (CTUs).

In the present disclosure, a "pixel" or a "pel" may mean a smallest unit constituting one picture (or image). In addition, "sample" may be used as a term corresponding to a pixel. A sample may generally represent a pixel or a value of a pixel, and may represent only a pixel/pixel value of a luma component or only a pixel/pixel value of a chroma component.

In the present disclosure, a "unit" may represent a basic unit of image processing. The unit may include at least one of a specific region of the picture and information related to the region. The unit may be used interchangeably with terms such as "sample array", "block" or "area" in some cases. In a general case, an M×N block may include samples (or sample arrays) or a set (or array) of transform coefficients of M columns and N rows.

In the present disclosure, "current block" may mean one of "current coding block", "current coding unit", "coding target block", "decoding target block" or "processing target block". When prediction is performed, "current block" may mean "current prediction block" or "prediction target block". When transform (inverse transform)/quantization (dequantization) is performed, "current block" may mean "current transform block" or "transform target block". When filtering is performed, "current block" may mean "filtering target block".

In addition, in the present disclosure, a "current block" may mean "a luma block of a current block" unless explicitly stated as a chroma block. The "chroma block of the current block" may be expressed by including an explicit description of a chroma block, such as "chroma block" or "current chroma block".

In the present disclosure, the term "/" and "," should be interpreted to indicate "and/or." For instance, the expression "A/B" and "A, B" may mean "A and/or B." Further, "A/B/C" and "A/B/C" may mean "at least one of A, B, and/or C."

In the present disclosure, the term "or" should be interpreted to indicate "and/or." For instance, the expression "A or B" may comprise 1) only "A", 2) only "B", and/or 3) both "A and B". In other words, in the present disclosure, the term "or" should be interpreted to indicate "additionally or alternatively."

Overview of Video Coding System

Figure 1:
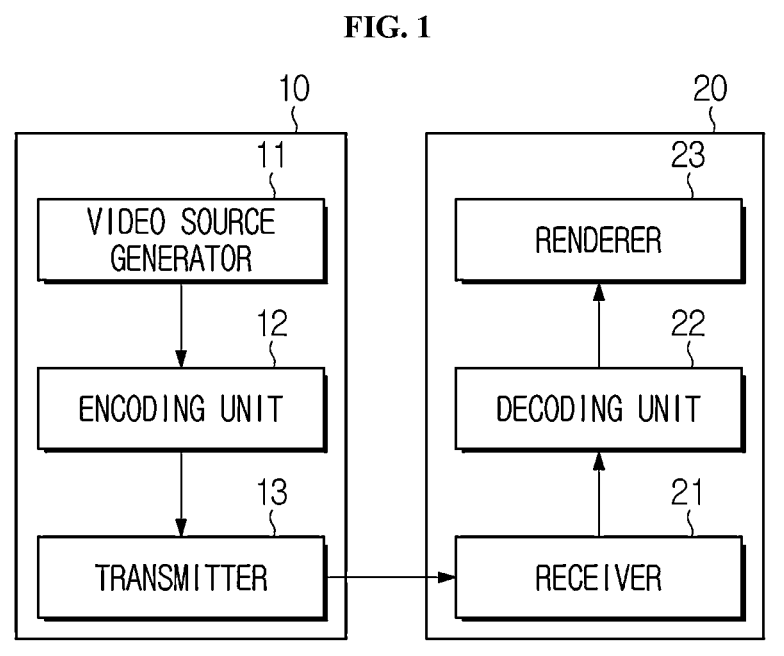

FIG. 1 is a view showing a video coding system according to the present disclosure.

The video coding system according to an embodiment may include a encoding apparatus 10 and a decoding apparatus 20. The encoding apparatus 10 may deliver encoded video and/or image information or data to the decoding apparatus 20 in the form of a file or streaming via a digital storage medium or network.

The encoding apparatus 10 according to an embodiment may include a video source generator 11, an encoding unit 12 and a transmitter 13. The decoding apparatus 20 according to an embodiment may include a receiver 21, a decoding unit 22 and a renderer 23. The encoding unit 12 may be called a video/image encoding unit, and the decoding unit 22 may be called a video/image decoding unit. The transmitter 13 may be included in the encoding unit 12. The receiver 21 may be included in the decoding unit 22. The renderer 23 may include a display and the display may be configured as a separate device or an external component.

The video source generator 11 may acquire a video/image through a process of capturing, synthesizing or generating the video/image. The video source generator 11 may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding unit 12 may encode an input video/image. The encoding unit 12 may perform a series of procedures such as prediction, transform, and quantization for compression and coding efficiency. The encoding unit 12 may output encoded data (encoded video/image information) in the form of a bitstream.

The transmitter 13 may transmit the encoded video/image information or data output in the form of a bitstream to the receiver 21 of the decoding apparatus 20 through a digital storage medium or a network in the form of a file or streaming. The digital storage medium may include various storage mediums such as USB, SD, CD, DVD, Blu-ray, HDD, SSD, and the like. The transmitter 13 may include an element for generating a media file through a predetermined file format and may include an element for transmission through a broadcast/communication network. The receiver 21 may extract/receive the bitstream from the storage medium or network and transmit the bitstream to the decoding unit 22.

The decoding unit 22 may decode the video/image by performing a series of procedures such as dequantization, inverse transform, and prediction corresponding to the operation of the encoding unit 12.

The renderer 23 may render the decoded video/image. The rendered video/image may be displayed through the display.

Overview of Image Encoding Apparatus

Figure 2:
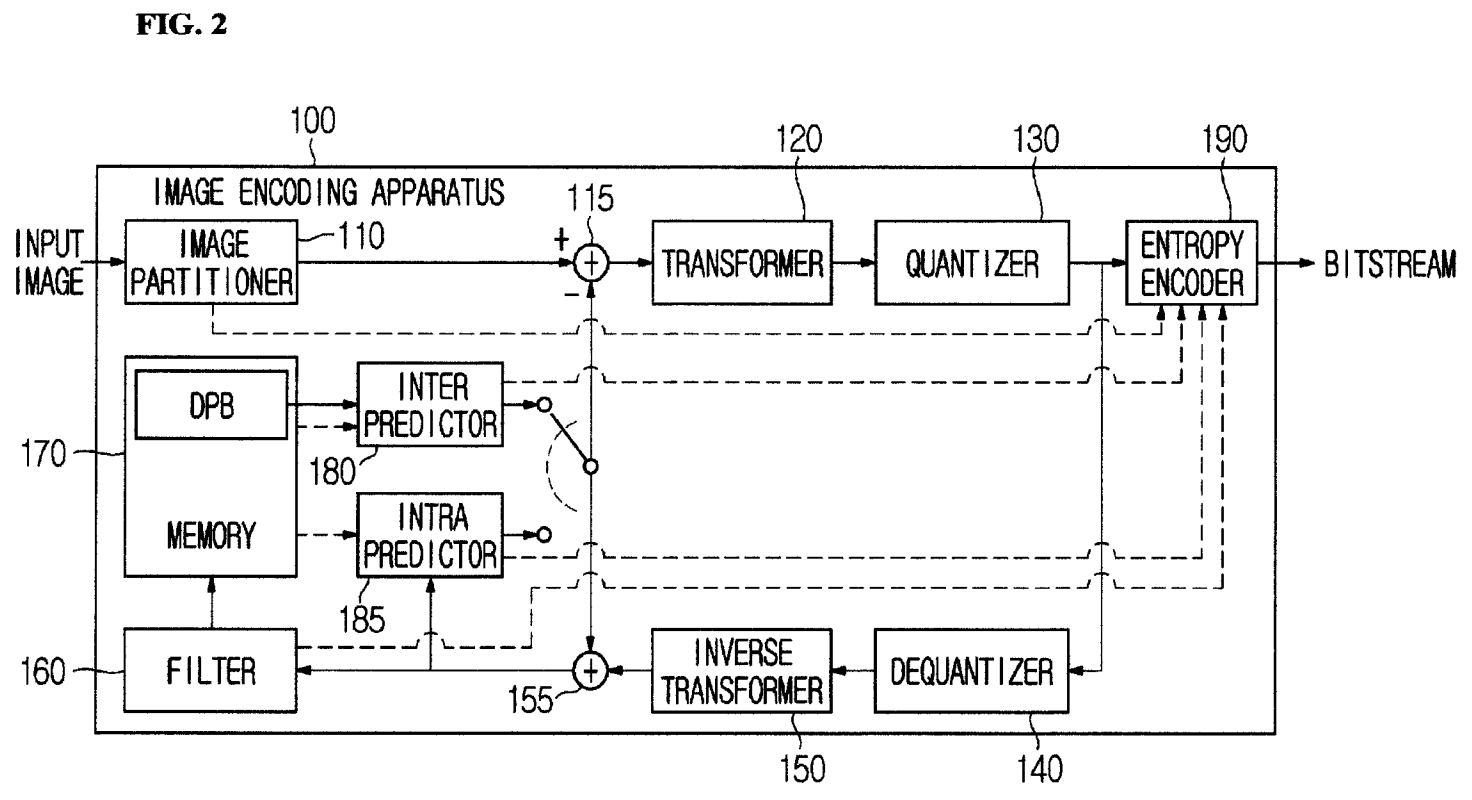

FIG. 2 is a view schematically showing an image encoding apparatus, to which an embodiment of the present disclosure is applicable.

As shown in FIG. 2, the image encoding apparatus 100 may include an image partitioner 110, a subtractor 115, a transformer 120, a quantizer 130, a dequantizer 140, an inverse transformer 150, an adder 155, a filter 160, a memory 170, an inter prediction unit 180, an intra prediction unit 185 and an entropy encoder 190. The inter prediction unit 180 and the intra prediction unit 185 may be collectively referred to as a "prediction unit". The transformer 120, the quantizer 130, the dequantizer 140 and the inverse transformer 150 may be included in a residual processor. The residual processor may further include the subtractor 115.

All or at least some of the plurality of components configuring the image encoding apparatus 100 may be configured by one hardware component (e.g., an encoder or a processor) in some embodiments. In addition, the memory 170 may include a decoded picture buffer (DPB) and may be configured by a digital storage medium.

The image partitioner 110 may partition an input image (or a picture or a frame) input to the image encoding apparatus 100 into one or more processing units. For example, the processing unit may be called a coding unit (CU). The coding unit may be acquired by recursively partitioning a coding tree unit (CTU) or a largest coding unit (LCU) according to a quad-tree binary-tree ternary-tree (QT/BT/TT) structure. For example, one coding unit may be partitioned into a plurality of coding units of a deeper depth based on a quad tree structure, a binary tree structure, and/or a ternary structure. For partitioning of the coding unit, a quad tree structure may be applied first and the binary tree structure and/or ternary structure may be applied later. The coding procedure according to the present disclosure may be performed based on the final coding unit that is no longer partitioned. The largest coding unit may be used as the final coding unit or the coding unit of deeper depth acquired by partitioning the largest coding unit may be used as the final coding unit. Here, the coding procedure may include a procedure of prediction, transform, and reconstruction, which will be described later. As another example, the processing unit of the coding procedure may be a prediction unit (PU) or a transform unit (TU). The prediction unit and the transform unit may be split or partitioned from the final coding unit. The prediction unit may be a unit of sample prediction, and the transform unit may be a unit for deriving a transform coefficient and/or a unit for deriving a residual signal from the transform coefficient.

The prediction unit (the inter prediction unit 180 or the intra prediction unit 185) may perform prediction on a block to be processed (current block) and generate a predicted block including prediction samples for the current block. The prediction unit may determine whether intra prediction or inter prediction is applied on a current block or CU basis. The prediction unit may generate various information related to prediction of the current block and transmit the generated information to the entropy encoder 190. The information on the prediction may be encoded in the entropy encoder 190 and output in the form of a bitstream.

The intra prediction unit 185 may predict the current block by referring to the samples in the current picture. The referred samples may be located in the neighborhood of the current block or may be located apart according to the intra prediction mode and/or the intra prediction technique. The intra prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra prediction unit 185 may determine the prediction mode applied to the current block by using a prediction mode applied to a neighboring block.

The inter prediction unit 180 may derive a predicted block for the current block based on a reference block (reference sample array) specified by a motion vector on a reference picture. In this case, in order to reduce the amount of motion information transmitted in the inter prediction mode, the motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like. The reference picture including the temporal neighboring block may be called a collocated picture (colPic). For example, the inter prediction unit 180 may configure a motion information candidate list based on neighboring blocks and generate information specifying which candidate is used to derive a motion vector and/or a reference picture index of the current block. Inter prediction may be performed based on various prediction modes. For example, in the case of a skip mode and a merge mode, the inter prediction unit 180 may use motion information of the neighboring block as motion information of the current block. In the case of the skip mode, unlike the merge mode, the residual signal may not be transmitted. In the case of the motion vector prediction (MVP) mode, the motion vector of the neighboring block may be used as a motion vector predictor, and the motion vector of the current block may be signaled by encoding a motion vector difference and an indicator for a motion vector predictor. The motion vector difference may mean a difference between the motion vector of the current block and the motion vector predictor.

The prediction unit may generate a prediction signal based on various prediction methods and prediction techniques described below. For example, the prediction unit may not only apply intra prediction or inter prediction but also simultaneously apply both intra prediction and inter prediction, in order to predict the current block. A prediction method of simultaneously applying both intra prediction and inter prediction for prediction of the current block may be called combined inter and intra prediction (CIIP). In addition, the prediction unit may perform intra block copy (IBC) for prediction of the current block. Intra block copy may be used for content image/video coding of a game or the like, for example, screen content coding (SCC). IBC is a method of predicting a current picture using a previously reconstructed reference block in the current picture at a location apart from the current block by a predetermined distance. When IBC is applied, the location of the reference block in the current picture may be encoded as a vector (block vector) corresponding to the predetermined distance. IBC basically performs prediction in the current picture, but may be performed similarly to inter prediction in that a reference block is derived within the current picture. That is, IBC may use at least one of the inter prediction techniques described in the present disclosure.

The prediction signal generated by the prediction unit may be used to generate a reconstructed signal or to generate a residual signal. The subtractor 115 may generate a residual signal (residual block or residual sample array) by subtracting the prediction signal (predicted block or prediction sample array) output from the prediction unit from the input image signal (original block or original sample array). The generated residual signal may be transmitted to the transformer 120.

The transformer 120 may generate transform coefficients by applying a transform technique to the residual signal. For example, the transform technique may include at least one of a discrete cosine transform (DCT), a discrete sine transform (DST), a karhunen-loève transform (KLT), a graph-based transform (GBT), or a conditionally non-linear transform (CNT). Here, the GBT means transform obtained from a graph when relationship information between pixels is represented by the graph. The CNT refers to transform acquired based on a prediction signal generated using all previously reconstructed pixels. In addition, the transform process may be applied to square pixel blocks having the same size or may be applied to blocks having a variable size rather than square.

The quantizer 130 may quantize the transform coefficients and transmit them to the entropy encoder 190. The entropy encoder 190 may encode the quantized signal (information on the quantized transform coefficients) and output a bitstream. The information on the quantized transform coefficients may be referred to as residual information. The quantizer 130 may rearrange quantized transform coefficients in a block form into a one-dimensional vector form based on a coefficient scanning order and generate information on the quantized transform coefficients based on the quantized transform coefficients in the one-dimensional vector form.

The entropy encoder 190 may perform various encoding methods such as, for example, exponential Golomb, context-adaptive variable length coding (CAVLC), context-adaptive binary arithmetic coding (CABAC), and the like. The entropy encoder 190 may encode information necessary for video/image reconstruction other than quantized transform coefficients (e.g., values of syntax elements, etc.) together or separately. Encoded information (e.g., encoded video/image information) may be transmitted or stored in units of network abstraction layers (NALs) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. The signaled information, transmitted information and/or syntax elements described in the present disclosure may be encoded through the above-described encoding procedure and included in the bitstream.

The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 190 and/or a storage unit (not shown) storing the signal may be included as internal/external element of the image encoding apparatus 100. Alternatively, the transmitter may be provided as the component of the entropy encoder 190.

The quantized transform coefficients output from the quantizer 130 may be used to generate a residual signal. For example, the residual signal (residual block or residual samples) may be reconstructed by applying dequantization and inverse transform to the quantized transform coefficients through the dequantizer 140 and the inverse transformer 150.

The adder 155 adds the reconstructed residual signal to the prediction signal output from the inter prediction unit 180 or the intra prediction unit 185 to generate a reconstructed signal (reconstructed picture, reconstructed block, reconstructed sample array). If there is no residual for the block to be processed, such as a case where the skip mode is applied, the predicted block may be used as the reconstructed block. The adder 155 may be called a reconstructor or a reconstructed block generator. The generated reconstructed signal may be used for intra prediction of a next block to be processed in the current picture and may be used for inter prediction of a next picture through filtering as described below.

The filter 160 may improve subjective/objective image quality by applying filtering to the reconstructed signal. For example, the filter 160 may generate a modified reconstructed picture by applying various filtering methods to the reconstructed picture and store the modified reconstructed picture in the memory 170, specifically, a DPB of the memory 170. The various filtering methods may include, for example, deblocking filtering, a sample adaptive offset, an adaptive loop filter, a bilateral filter, and the like. The filter 160 may generate various information related to filtering and transmit the generated information to the entropy encoder 190 as described later in the description of each filtering method. The information related to filtering may be encoded by the entropy encoder 190 and output in the form of a bitstream.

The modified reconstructed picture transmitted to the memory 170 may be used as the reference picture in the inter prediction unit 180. When inter prediction is applied through the image encoding apparatus 100, prediction mismatch between the image encoding apparatus 100 and the image decoding apparatus may be avoided and encoding efficiency may be improved.

The DPB of the memory 170 may store the modified reconstructed picture for use as a reference picture in the inter prediction unit 180. The memory 170 may store the motion information of the block from which the motion information in the current picture is derived (or encoded) and/or the motion information of the blocks in the picture that have already been reconstructed. The stored motion information may be transmitted to the inter prediction unit 180 and used as the motion information of the spatial neighboring block or the motion information of the temporal neighboring block. The memory 170 may store reconstructed samples of reconstructed blocks in the current picture and may transfer the reconstructed samples to the intra prediction unit 185.

Overview of Image Decoding Apparatus

FIG. 3 is a view schematically showing an image decoding apparatus, to which an embodiment of the present disclosure is applicable.

As shown in FIG. 3, the image decoding apparatus 200 may include an entropy decoder 210, a dequantizer 220, an inverse transformer 230, an adder 235, a filter 240, a memory 250, an inter prediction unit 260 and an intra prediction unit 265. The inter prediction unit 260 and the intra prediction unit 265 may be collectively referred to as a "prediction unit". The dequantizer 220 and the inverse transformer 230 may be included in a residual processor.

All or at least some of a plurality of components configuring the image decoding apparatus 200 may be configured by a hardware component (e.g., a decoder or a processor) according to an embodiment. In addition, the memory 250 may include a decoded picture buffer (DPB) or may be configured by a digital storage medium.

The image decoding apparatus 200, which has received a bitstream including video/image information, may reconstruct an image by performing a process corresponding to a process performed by the image encoding apparatus 100 of FIG. 2. For example, the image decoding apparatus 200 may perform decoding using a processing unit applied in the image encoding apparatus. Thus, the processing unit of decoding may be a coding unit, for example. The coding unit may be acquired by partitioning a coding tree unit or a largest coding unit. The reconstructed image signal decoded and output through the image decoding apparatus 200 may be reproduced through a reproducing apparatus (not shown).

The image decoding apparatus 200 may receive a signal output from the image encoding apparatus of FIG. 2 in the form of a bitstream. The received signal may be decoded through the entropy decoder 210. For example, the entropy decoder 210 may parse the bitstream to derive information (e.g., video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The image decoding apparatus may further decode picture based on the information on the parameter set and/or the general constraint information. Signaled/received information and/or syntax elements described in the present disclosure may be decoded through the decoding procedure and obtained from the bitstream. For example, the entropy decoder 210 decodes the information in the bitstream based on a coding method such as exponential Golomb coding, CAVLC, or CABAC, and output values of syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a neighboring block and a decoding target block or information of a symbol/bin decoded in a previous stage, and perform arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 210 may be provided to the prediction unit (the inter prediction unit 260 and the intra prediction unit 265), and the residual value on which the entropy decoding was performed in the entropy decoder 210, that is, the quantized transform coefficients and related parameter information, may be input to the dequantizer 220. In addition, information on filtering among information decoded by the entropy decoder 210 may be provided to the filter 240. Meanwhile, a receiver (not shown) for receiving a signal output from the image encoding apparatus may be further configured as an internal/external element of the image decoding apparatus 200, or the receiver may be a component of the entropy decoder 210.

Meanwhile, the image decoding apparatus according to the present disclosure may be referred to as a video/image/picture decoding apparatus. The image decoding apparatus may be classified into an information decoder (video/image/picture information decoder) and a sample decoder (video/image/picture sample decoder). The information decoder may include the entropy decoder 210. The sample decoder may include at least one of the dequantizer 220, the inverse transformer 230, the adder 235, the filter 240, the memory 250, the inter prediction unit 260 or the intra prediction unit 265.

The dequantizer 220 may dequantize the quantized transform coefficients and output the transform coefficients. The dequantizer 220 may rearrange the quantized transform coefficients in the form of a two-dimensional block. In this case, the rearrangement may be performed based on the coefficient scanning order performed in the image encoding apparatus. The dequantizer 220 may perform dequantization on the quantized transform coefficients by using a quantization parameter (e.g., quantization step size information) and obtain transform coefficients.

The inverse transformer 230 may inversely transform the transform coefficients to obtain a residual signal (residual block, residual sample array).

The prediction unit may perform prediction on the current block and generate a predicted block including prediction samples for the current block. The prediction unit may determine whether intra prediction or inter prediction is applied to the current block based on the information on the prediction output from the entropy decoder 210 and may determine a specific intra/inter prediction mode (prediction technique).

It is the same as described in the prediction unit of the image encoding apparatus 100 that the prediction unit may generate the prediction signal based on various prediction methods (techniques) which will be described later.

The intra prediction unit 265 may predict the current block by referring to the samples in the current picture. The description of the intra prediction unit 185 is equally applied to the intra prediction unit 265.

The inter prediction unit 260 may derive a predicted block for the current block based on a reference block (reference sample array) specified by a motion vector on a reference picture. In this case, in order to reduce the amount of motion information transmitted in the inter prediction mode, motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter prediction unit 260 may configure a motion information candidate list based on neighboring blocks and derive a motion vector of the current block and/or a reference picture index based on the received candidate selection information. Inter prediction may be performed based on various prediction modes, and the information on the prediction may include information specifying a mode of inter prediction for the current block.

The adder 235 may generate a reconstructed signal (reconstructed picture, reconstructed block, reconstructed sample array) by adding the obtained residual signal to the prediction signal (predicted block, predicted sample array) output from the prediction unit (including the inter prediction unit 260 and/or the intra prediction unit 265). If there is no residual for the block to be processed, such as when the skip mode is applied, the predicted block may be used as the reconstructed block. The description of the adder 155 is equally applicable to the adder 235. The adder 235 may be called a reconstructor or a reconstructed block generator. The generated reconstructed signal may be used for intra prediction of a next block to be processed in the current picture and may be used for inter prediction of a next picture through filtering as described below.

The filter 240 may improve subjective/objective image quality by applying filtering to the reconstructed signal. For example, the filter 240 may generate a modified reconstructed picture by applying various filtering methods to the reconstructed picture and store the modified reconstructed picture in the memory 250, specifically, a DPB of the memory 250. The various filtering methods may include, for example, deblocking filtering, a sample adaptive offset, an adaptive loop filter, a bilateral filter, and the like.

The (modified) reconstructed picture stored in the DPB of the memory 250 may be used as a reference picture in the inter prediction unit 260. The memory 250 may store the motion information of the block from which the motion information in the current picture is derived (or decoded) and/or the motion information of the blocks in the picture that have already been reconstructed. The stored motion information may be transmitted to the inter prediction unit 260 so as to be utilized as the motion information of the spatial neighboring block or the motion information of the temporal neighboring block. The memory 250 may store reconstructed samples of reconstructed blocks in the current picture and transfer the reconstructed samples to the intra prediction unit 265.

In the present disclosure, the embodiments described in the filter 160, the inter prediction unit 180, and the intra prediction unit 185 of the image encoding apparatus 100 may be equally or correspondingly applied to the filter 240, the inter prediction unit 260, and the intra prediction unit 265 of the image decoding apparatus 200.

Overview of Image Partitioning

The video/image coding method according to the present disclosure may be performed based on an image partitioning structure as follows. Specifically, the procedures of prediction, residual processing ((inverse) transform, (de) quantization, etc.), syntax element coding, and filtering, which will be described later, may be performed based on a CTU, CU (and/or TU, PU) derived based on the image partitioning structure. The image may be partitioned in block units and the block partitioning procedure may be performed in the image partitioner 110 of the encoding apparatus. The partitioning related information may be encoded by the entropy encoder 190 and transmitted to the decoding apparatus in the form of a bitstream. The entropy decoder 210 of the decoding apparatus may derive a block partitioning structure of the current picture based on the partitioning related information obtained from the bitstream, and based on this, may perform a series of procedures (e.g., prediction, residual processing, block/picture reconstruction, in-loop filtering, etc.) for image decoding.

Figure 4:
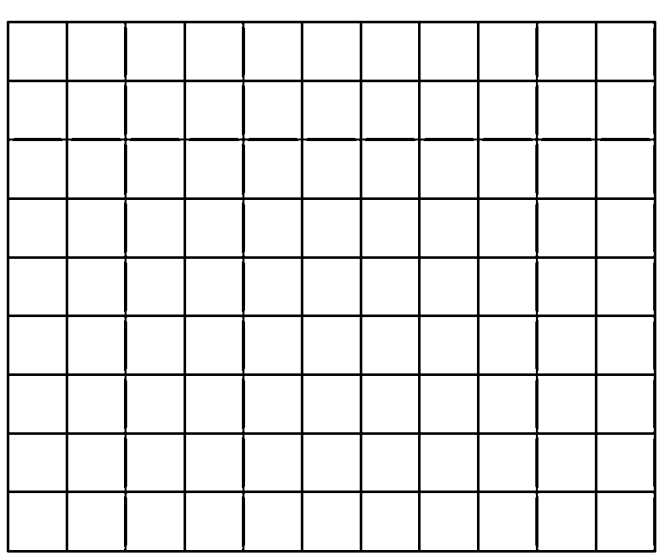
FIG. 4 is a view showing a partitioning structure of an image according to an embodiment.

Pictures may be partitioned into a sequence of coding tree units (CTUs). FIG. 4 shows an example in which a picture is partitioned into CTUs. The CTU may correspond to a coding tree block (CTB). Alternatively, the CTU may include a coding tree block of luma samples and two coding tree blocks of corresponding chroma samples. For example, for a picture that contains three sample arrays, the CTU may include an N×N block of luma samples and two corresponding blocks of chroma samples.

Overview of Partitioning of CTU

As described above, the coding unit may be acquired by recursively partitioning the coding tree unit (CTU) or the largest coding unit (LCU) according to a quad-tree/binary-tree/ternary-tree (QT/BT/TT) structure. For example, the CTU may be first partitioned into quadtree structures. Thereafter, leaf nodes of the quadtree structure may be further partitioned by a multi-type tree structure.

Partitioning according to quadtree means that a current CU (or CTU) is partitioned into equally four. By partitioning according to quadtree, the current CU may be partitioned into four CUs having the same width and the same height. When the current CU is no longer partitioned into the quadtree structure, the current CU corresponds to the leaf node of the quad-tree structure. The CU corresponding to the leaf node of the quadtree structure may be no longer partitioned and may be used as the above-described final coding unit. Alternatively, the CU corresponding to the leaf node of the quadtree structure may be further partitioned by a multi-type tree structure.

Figure 5:
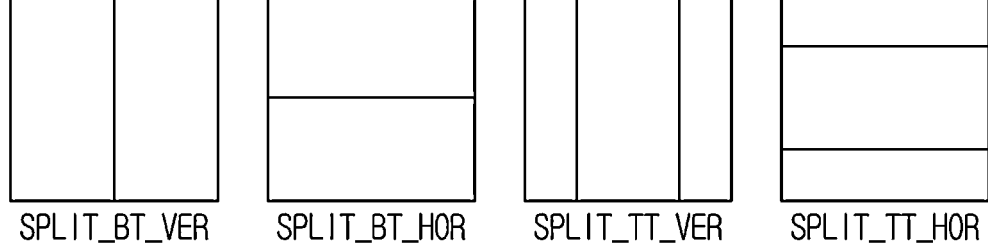
FIG. 5 is a view showing an embodiment of a partitioning type of a block according to a multi-type tree structure.

FIG. 5 is a view showing an embodiment of a partitioning type of a block according to a multi-type tree structure. Partitioning according to the multi-type tree structure may include two types of splitting according to a binary tree structure and two types of splitting according to a ternary tree structure.

The two types of splitting according to the binary tree structure may include vertical binary splitting (SPLIT_BT_VER) and horizontal binary splitting (SPLIT_BT_HOR). Vertical binary splitting (SPLIT_BT_VER) means that the current CU is split into equally two in the vertical direction. As shown in FIG. 4, by vertical binary splitting, two CUs having the same height as the current CU and having a width which is half the width of the current CU may be generated. Horizontal binary splitting (SPLIT_BT_HOR) means that the current CU is split into equally two in the horizontal direction. As shown in FIG. 5, by horizontal binary splitting, two CUs having a height which is half the height of the current CU and having the same width as the current CU may be generated.

Two types of splitting according to the ternary tree structure may include vertical ternary splitting (SPLIT_TT_VER) and horizontal ternary splitting (SPLIT_TT_HOR). In vertical ternary splitting (SPLIT_TT_VER), the current CU is split in the vertical direction at a ratio of 1:2:1. As shown in FIG. 5, by vertical ternary splitting, two CUs having the same height as the current CU and having a width which is ¼ of the width of the current CU and a CU having the same height as the current CU and having a width which is half the width of the current CU may be generated. In horizontal ternary splitting (SPLIT_TT_HOR), the current CU is split in the horizontal direction at a ratio of 1:2:1. As shown in FIG. 5, by horizontal ternary splitting, two CUs having a height which is ¼ of the height of the current CU and having the same width as the current CU and a CU having a height which is half the height of the current CU and having the same width as the current CU may be generated.

Figure 6:
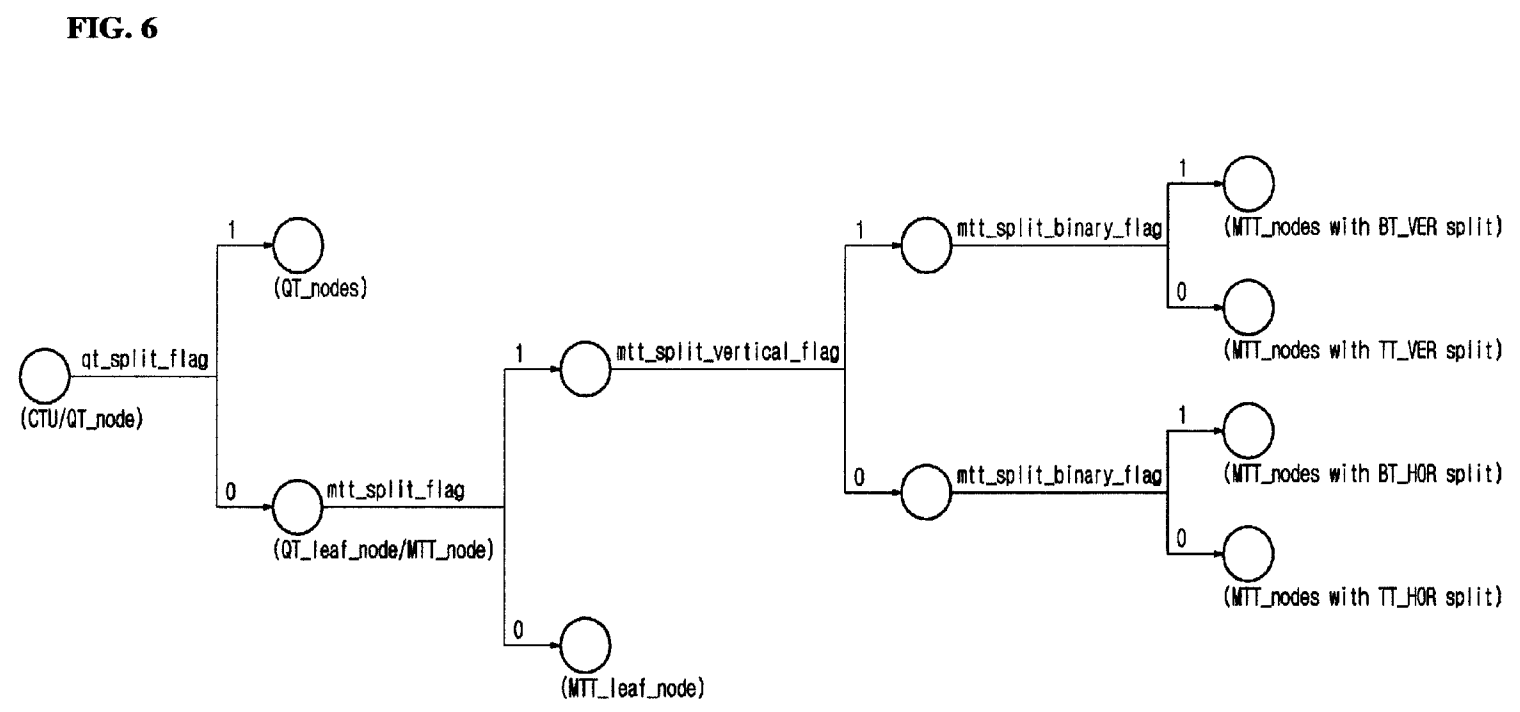

FIG. 6 is a view showing a signaling mechanism of block splitting information in a quadtree with nested multi-type tree structure according to the present disclosure.

Here, the CTU is treated as the root node of the quadtree, and is partitioned for the first time into a quadtree structure. Information (e.g., qt_split_flag) specifying whether quadtree splitting is performed on the current CU (CTU or node (QT_node) of the quadtree) is signaled. For example, when qt_split_flag has a first value (e.g., "1"), the current CU may be quadtree-partitioned. In addition, when qt_split_flag has a second value (e.g., "0"), the current CU is not quadtree-partitioned, but becomes the leaf node (QT_leaf_node) of the quadtree. Each quadtree leaf node may then be further partitioned into multitype tree structures. That is, the leaf node of the quadtree may become the node (MTT_node) of the multi-type tree. In the multitype tree structure, a first flag (e.g., Mtt_split_cu_flag) is signaled to specify whether the current node is additionally partitioned. If the corresponding node is additionally partitioned (e.g., if the first flag is 1), a second flag (e.g., Mtt_split_cu_vertical_flag) may be signaled to specify the splitting direction. For example, the splitting direction may be a vertical direction if the second flag is 1 and may be a horizontal direction if the second flag is 0. Then, a third flag (e.g., Mtt_split_cu_binary_flag) may be signaled to specify whether the split type is a binary split type or a ternary split type. For example, the split type may be a binary split type when the third flag is 1 and may be a ternary split type when the third flag is 0. The node of the multi-type tree acquired by binary splitting or ternary splitting may be further partitioned into multi-type tree structures. However, the node of the multi-type tree may not be partitioned into quadtree structures. If the first flag is 0, the corresponding node of the multi-type tree is no longer split but becomes the leaf node (MTT_leaf_node) of the multi-type tree. The CU corresponding to the leaf node of the multi-type tree may be used as the above-described final coding unit.

Based on the mtt_split_cu_vertical_flag and the mtt_split_cu_binary_flag, a multi-type tree splitting mode (MttSplitMode) of a CU may be derived as shown in Table 1 below. In the following description, the multi-type tree splitting mode may be referred to as a multitree splitting type or splitting type.

TABLE 1

| MttSplitMode | mtt_split_cu_vertical_flag | mtt_split_cu_binary_flag |
|---|---|---|
| SPLIT_TT_HOR | 0 | 0 |
| SPLIT_BT_HOR | 0 | 1 |
| SPLIT_TT_VER | 1 | 0 |
| SPLIT_BT_VER | 1 | 1 |

Figure 7:
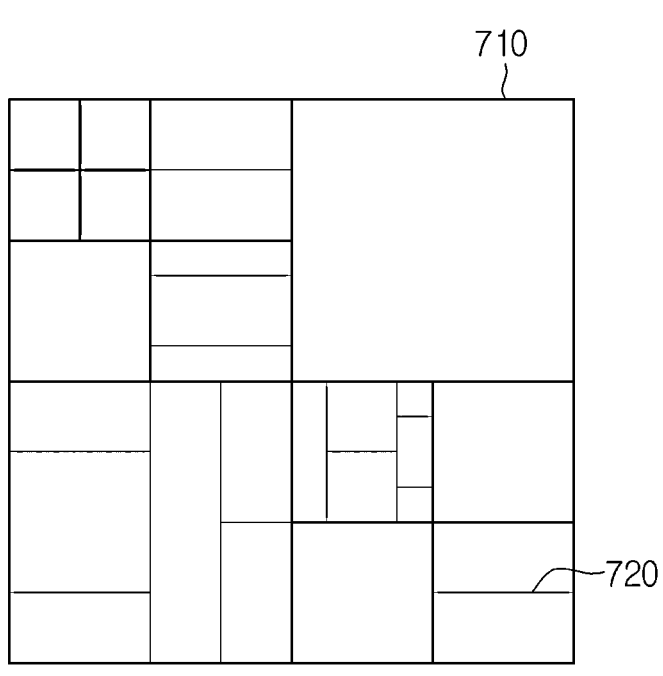
FIG. 7 is a view showing an embodiment in which a CTU is partitioned into multiple CUs.

FIG. 7 is a view showing an example in which a CTU is partitioned into multiple CUs by applying a multi-type tree after applying a quadtree. In FIG. 7, bold block edges 710 represent quadtree partitioning and the remaining edges 720 represent multitype tree partitioning.

The CU may correspond to a coding block (CB). In an embodiment, the CU may include a coding block of luma samples and two coding blocks of chroma samples corresponding to the luma samples.

A chroma component (sample) CB or TB size may be derived based on a luma component (sample) CB or TB size according to the component ratio according to the color format (chroma format, e.g., 4:4:4, 4:2:2, 4:2:0 or the like) of the picture/image. In case of 4:4:4 color format, the chroma component CB/TB size may be set equal to be luma component CB/TB size. In case of 4:2:2 color format, the width of the chroma component CB/TB may be set to half the width of the luma component CB/TB and the height of the chroma component CB/TB may be set to the height of the luma component CB/TB. In case of 4:2:0 color format, the width of the chroma component CB/TB may be set to half the width of the luma component CB/TB and the height of the chroma component CB/TB may be set to half the height of the luma component CB/TB.

In an embodiment, when the size of the CTU is 128 based on the luma sample unit, the size of the CU may have a size from 128×128 to 4×4 which is the same size as the CTU. In one embodiment, in case of 4:2:0 color format (or chroma format), a chroma CB size may have a size from 64×64 to 2×2.

Meanwhile, in an embodiment, the CU size and the TU size may be the same. Alternatively, there may be a plurality of TUs in a CU region. The TU size generally represents a luma component (sample) transform block (TB) size.

The TU size may be derived based a largest allowable TB size maxTbSize which is a predetermined value. For example, when the CU size is greater than maxTbSize, a plurality of TUs (TBs) having maxTbSize may be derived from the CU and transform/inverse transform may be performed in units of TU (TB). For example, the largest allowable luma TB size may be 64×64 and the largest allowable chroma TB size may be 32×32. If the width or height of the CB partitioned according to the tree structure is larger than the largest transform width or height, the CB may be automatically (or implicitly) partitioned until the TB size limit in the horizontal and vertical directions is satisfied.

In addition, for example, when intra prediction is applied, an intra prediction mode/type may be derived in units of CU (or CB) and a neighboring reference sample derivation and prediction sample generation procedure may be performed in units of TU (or TB). In this case, there may be one or a plurality of TUs (or TBs) in one CU (or CB) region and, in this case, the plurality of TUs or (TBs) may share the same intra prediction mode/type.

Meanwhile, for a quadtree coding tree scheme with nested multitype tree, the following parameters may be signaled as SPS syntax elements from the encoding apparatus to the decoding apparatus. For example, at least one of a CTU size which is a parameter representing the root node size of a quadtree, MinQTSize which is a parameter representing the minimum allowed quadtree leaf node size, MaxBtSize which is a parameter representing the maximum allowed binary tree root node size, MaxTtSize which is a parameter representing the maximum allowed ternary tree root node size, MaxMttDepth which is a parameter representing the maximum allowed hierarchy depth of multi-type tree splitting from a quadtree leaf node, MinBtSize which is a parameter representing the minimum allowed binary tree leaf node size, or MinTtSize which is a parameter representing the minimum allowed ternary tree leaf node size is signaled.

As an embodiment of using 4:2:0 chroma format, the CTU size may be set to 128×128 luma blocks and two 64×64 chroma blocks corresponding to the luma blocks. In this case, MinOTSize may be set to 16×16, MaxBtSize may be set to 128×128, MaxTtSzie may be set to 64×64, MinBtSize and MinTtSize may be set to 4×4, and MaxMttDepth may be set to 4. Quadtree partitioning may be applied to the CTU to generate quadtree leaf nodes. The quadtree leaf node may be called a leaf QT node. Quadtree leaf nodes may have a size from a 16×16 size (e.g., the MinOTSize) to a 128×128 size (e.g., the CTU size). If the leaf QT node is 128×128, it may not be additionally partitioned into a binary tree/ternary tree. This is because, in this case, even if partitioned, it exceeds MaxBtsize and MaxTtsize (e.g., 64×64). In other cases, leaf QT nodes may be further partitioned into a multitype tree. Therefore, the leaf QT node is the root node for the multitype tree, and the leaf QT node may have a multitype tree depth (mttDepth) 0 value. If the multitype tree depth reaches MaxMttdepth (e.g., 4), further partitioning may not be considered further. If the width of the multitype tree node is equal to MinBtSize and less than or equal to 2×MinTtSize, then no further horizontal partitioning may be considered. If the height of the multitype tree node is equal to MinBtSize and less than or equal to 2×MinTtSize, no further vertical partitioning may be considered. When partitioning is not considered, the encoding apparatus may skip signaling of partitioning information. In this case, the decoding apparatus may derive partitioning information with a predetermined value.

Meanwhile, one CTU may include a coding block of luma samples (hereinafter referred to as a "luma block") and two coding blocks of chroma samples corresponding thereto (hereinafter referred to as "chroma blocks"). The above-described coding tree scheme may be equally or separately applied to the luma block and chroma block of the current CU. Specifically, the luma and chroma blocks in one CTU may be partitioned into the same block tree structure and, in this case, the tree structure is represented as SINGLE_TREE. Alternatively, the luma and chroma blocks in one CTU may be partitioned into separate block tree structures, and, in this case, the tree structure may be represented as DUAL_TREE. That is, when the CTU is partitioned into dual trees, the block tree structure for the luma block and the block tree structure for the chroma block may be separately present. In this case, the block tree structure for the luma block may be called DUAL_TREE_LUMA, and the block tree structure for the chroma component may be called DUAL_TREE_CHROMA. For P and B slice/tile groups, luma and chroma blocks in one CTU may be limited to have the same coding tree structure. However, for I slice/tile groups, luma and chroma blocks may have a separate block tree structure from each other. If the separate block tree structure is applied, the luma CTB may be partitioned into CUs based on a particular coding tree structure, and the chroma CTB may be partitioned into chroma CUs based on another coding tree structure. That is, this means that a CU in an I slice/tile group, to which the separate block tree structure is applied, may include a coding block of luma components or coding blocks of two chroma components and a CU of a P or B slice/tile group may include blocks of three color components (a luma component and two chroma components).

Although a quadtree coding tree structure with a nested multitype tree has been described, a structure in which a CU is partitioned is not limited thereto. For example, the BT structure and the TT structure may be interpreted as a concept included in a multiple partitioning tree (MPT) structure, and the CU may be interpreted as being partitioned through the QT structure and the MPT structure. In an example where the CU is partitioned through a QT structure and an MPT structure, a syntax element (e.g., MPT_split_type) including information on how many blocks the leaf node of the QT structure is partitioned into and a syntax element (ex. MPT_split_mode) including information on which of vertical and horizontal directions the leaf node of the QT structure is partitioned into may be signaled to determine a partitioning structure.

In another example, the CU may be partitioned in a different way than the QT structure, BT structure or TT structure. That is, unlike that the CU of the lower depth is partitioned into ¼ of the CU of the higher depth according to the QT structure, the CU of the lower depth is partitioned into ½ of the CU of the higher depth according to the BT structure, or the CU of the lower depth is partitioned into ¼ or ½ of the CU of the higher depth according to the TT structure, the CU of the lower depth may be partitioned into ⅕, ⅓, ⅜, ⅗, ⅔, or ⅝ of the CU of the higher depth in some cases, and the method of partitioning the CU is not limited thereto.

The quadtree coding block structure with the multi-type tree may provide a very flexible block partitioning structure. Because of the partition types supported in a multi-type tree, different partition patterns may potentially result in the same coding block structure in some cases. In the encoding apparatus and the decoding apparatus, by limiting the occurrence of such redundant partition patterns, a data amount of partitioning information may be reduced.

Figure 8:
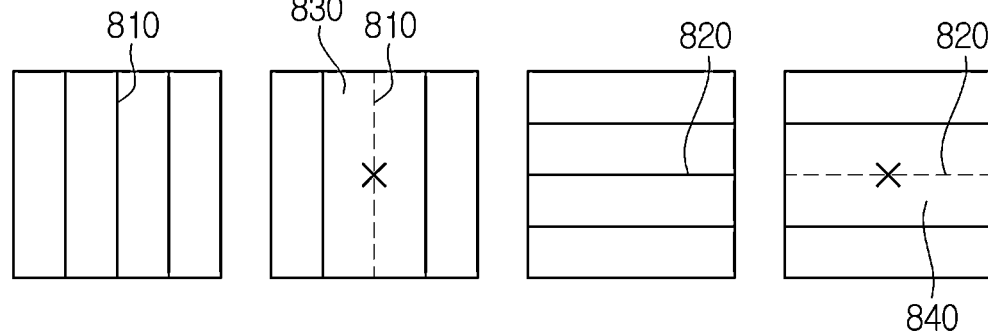
FIG. 8 is a view illustrating an embodiment of a redundant splitting pattern.

For example, FIG. 8 shows redundant splitting patterns which may occur in binary tree splitting and ternary tree splitting. As shown in FIG. 8, continuous binary splitting 810 and 820 for one direction of two-step levels have the same coding block structure as binary splitting for a center partition after ternary splitting. In this case, binary tree splitting for center blocks 830 and 840 of ternary tree splitting may be prohibited. this prohibition is applicable to CUs of all pictures. When such specific splitting is prohibited, signaling of corresponding syntax elements may be modified by reflecting this prohibited case, thereby reducing the number of bits signaled for splitting. For example, as shown in the example shown in FIG. 8, when binary tree splitting for the center block of the CU is prohibited, a syntax element mtt_split_cu_binary_flag specifying whether splitting is binary splitting or ternary splitting is not signaled and the value thereof may be derived as 0 by a decoding apparatus.

Overview of Inter Prediction

Hereinafter, inter prediction according to the present disclosure will be described.

The prediction unit of an image encoding apparatus/image decoding apparatus according to the present disclosure may perform inter prediction in units of blocks to derive a prediction sample. Inter prediction may represent prediction derived in a manner that is dependent on data elements (e.g., sample values, motion information, etc.) of picture(s) other than a current picture. When inter prediction applies to the current block, a predicted block (prediction block or a prediction sample array) for the current block may be derived based on a reference block (reference sample array) specified by a motion vector on a reference picture indicated by a reference picture index. In this case, in order to reduce the amount of motion information transmitted in an inter prediction mode, motion information of the current block may be predicted in units of blocks, subblocks or samples, based on correlation of motion information between a neighboring block and the current block. The motion information may include a motion vector and a reference picture index. The motion information may further include inter prediction type (L0 prediction, L1 prediction, Bi prediction, etc.) information. When applying inter prediction, the neighboring block may include a spatial neighboring block present in the current picture and a temporal neighboring block present in the reference picture. A reference picture including the reference block and a reference picture including the temporal neighboring block may be the same or different. The temporal neighboring block may be referred to as a collocated reference block, collocated CU (ColCU) or colBlock, and the reference picture including the temporal neighboring block may be referred to as a collocated picture (colPic) or colPicture. For example, a motion information candidate list may be constructed based on the neighboring blocks of the current block, and flag or index information specifying which candidate is selected (used) may be signaled in order to derive the motion vector of the current block and/or the reference picture index.

Inter prediction may be performed based on various prediction modes. For example, in the case of a skip mode and a merge mode, the motion information of the current block may be equal to the motion information of the selected neighboring block. In the case of the skip mode, a residual signal may not be transmitted unlike the merge mode. In the case of a motion information prediction (MVP) mode, the motion vector of the selected neighboring block may be used as a motion vector predictor and a motion vector difference may be signaled. In this case, the motion vector of the current block may be derived using a sum of the motion vector predictor and the motion vector difference. In the present disclosure, the MVP mode may have the same meaning as advanced motion vector prediction (AMVP).

The motion information may include L0 motion information and/or L1 motion information according to the inter prediction type (L0 prediction, L1 prediction, Bi prediction, etc.). The motion vector in an L0 direction may be referred to as an L0 motion vector or MVL0, and the motion vector in an L1 direction may be referred to as an L1 motion vector or MVL1. Prediction based on the L0 motion vector may be referred to as L0 prediction, prediction based on the L1 motion vector may be referred to as L1 prediction, and prediction based both the L0 motion vector and the L1 motion vector may be referred to as Bi prediction. Here, the L0 motion vector may specify a motion vector associated with a reference picture list L0 (L0) and the L1 motion vector may specify a motion vector associated with a reference picture list L1 (L1). The reference picture list L0 may include pictures before the current picture in output order as reference pictures, and the reference picture list L1 may include pictures after the current picture in output order. The previous pictures may be referred to as forward (reference) pictures and the subsequent pictures may be referred to as reverse (reference) pictures. The reference picture list L0 may further include pictures after the current picture in output order as reference pictures. In this case, within the reference picture list L0, the previous pictures may be first indexed and the subsequent pictures may then be indexed. The reference picture list L1 may further include pictures before the current picture in output order as reference pictures. In this case, within the reference picture list L1, the subsequent pictures may be first indexed and the previous pictures may then be indexed. Here, the output order may correspond to picture order count (POC) order.

Figures 9, 10:
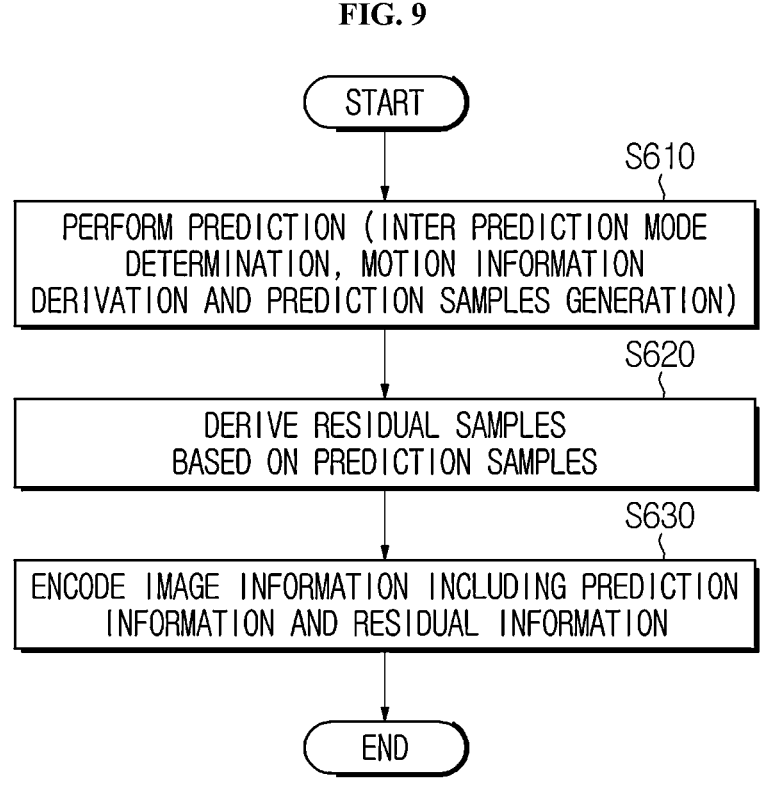
FIG. 9 is a flowchart illustrating an inter prediction based video/image encoding method.
FIG. 10 is a view illustrating the configuration of an inter prediction unit 180 according to the present disclosure.

FIG. 9 is a flowchart illustrating an inter prediction based video/image encoding method.

FIG. 10 is a view illustrating the configuration of an inter prediction unit 180 according to the present disclosure.

The encoding method of FIG. 9 may be performed by the image encoding apparatus of FIG. 2. Specifically, step S610 may be performed by the inter prediction unit 180, and step S620 may be performed by the residual processor. Specifically, step S620 may be performed by the subtractor 115. Step S630 may be performed by the entropy encoder 190. The prediction information of step S630 may be derived by the inter prediction unit 180, and the residual information of step S630 may be derived by the residual processor. The residual information is information on the residual samples. The residual information may include information on quantized transform coefficients for the residual samples. As described above, the residual samples may be derived as transform coefficients through the transformer 120 of the image encoding apparatus, and the transform coefficients may be derived as quantized transform coefficients through the quantizer 130. Information on the quantized transform coefficients may be encoded by the entropy encoder 190 through a residual coding procedure.

The image encoding apparatus may perform inter prediction on a current block (S610). The image encoding apparatus may derive an inter prediction mode and motion information of the current block and generate prediction samples of the current block. Here, inter prediction mode determination, motion information derivation and prediction samples generation procedures may be simultaneously performed or any one thereof may be performed before the other procedures. For example, as shown in FIG. 10, the inter prediction unit 180 of the image encoding apparatus may include a prediction mode determination unit 181, a motion information derivation unit 182 and a prediction sample derivation unit 183. The prediction mode determination unit 181 may determine the prediction mode of the current block, the motion information derivation unit 182 may derive the motion information of the current block, and the prediction sample derivation unit 183 may derive the prediction samples of the current block. For example, the inter prediction unit 180 of the image encoding apparatus may search for a block similar to the current block within a predetermined area (search area) of reference pictures through motion estimation, and derive a reference block whose a difference from the current block is equal to or less than a predetermined criterion or a minimum. Based on this, a reference picture index specifying a reference picture in which the reference block is located may be derived, and a motion vector may be derived based on a position difference between the reference block and the current block. The image encoding apparatus may determine a mode applying to the current block among various prediction modes. The image encoding apparatus may compare rate-distortion (RD) costs for the various prediction modes and determine an optimal prediction mode of the current block. However, the method of determining the prediction mode of the current block by the image encoding apparatus is not limited to the above example, and various methods may be used.

For example, when a skip mode or a merge mode applies to the current block, the image encoding apparatus may derive merge candidates from neighboring blocks of the current block and construct a merge candidate list using the derived merge candidates. In addition, the image encoding apparatus may derive a reference block whose a difference from the current block is equal to or less than a predetermined criterion or a minimum, among reference blocks specified by merge candidates included in the merge candidate list. In this case, a merge candidate associated with the derived reference block may be selected, and merge index information specifying the selected merge candidate may be generated and signaled to an image decoding apparatus. The motion information of the current block may be derived using the motion information of the selected merge candidate.

As another example, when an MVP mode applies to the current block, the image encoding apparatus may derive motion vector predictor (mvp) candidates from the neighboring blocks of the current block and construct an mvp candidate list using the derived mvp candidates. In addition, the image encoding apparatus may use the motion vector of the mvp candidate selected from among the mvp candidates included in the mvp candidate list as the mvp of the current block. In this case, for example, the motion vector indicating the reference block derived by the above-described motion estimation may be used as the motion vector of the current block, an mvp candidate with a motion vector having a smallest difference from the motion vector of the current block among the mvp candidates may be the selected mvp candidate. A motion vector difference (MVD) which is a difference obtained by subtracting the mvp from the motion vector of the current block may be derived. In this case, index information specifying the selected mvp candidate and information on the MVD may be signaled to the image decoding apparatus. In addition, when applying the MVP mode, the value of the reference picture index may be constructed as reference picture index information and separately signaled to the image decoding apparatus.

The image encoding apparatus may derive residual samples based on the prediction samples (S620). The image encoding apparatus may derive the residual samples through comparison between original samples of the current block and the prediction samples. For example, the residual sample may be derived by subtracting a corresponding prediction sample from an original sample.

The image encoding apparatus may encode image information including prediction information and residual information (S630). The image encoding apparatus may output the encoded image information in the form of a bitstream. The prediction information may include prediction mode information (e.g., skip flag, merge flag or mode index, etc.) and information on motion information as information related to the prediction procedure. Among the prediction mode information, the skip flag specifies whether a skip mode applies to the current block, and the merge flag specifies whether the merge mode applies to the current block. Alternatively, the prediction mode information may specify one of a plurality of prediction modes, such as a mode index. When the skip flag and the merge flag are 0, it may be determined that the MVP mode applies to the current block. The information on the motion information may include candidate selection information (e.g., merge index, mvp flag or mvp index) which is information for deriving a motion vector. Among the candidate selection information, the merge index may be signaled when the merge mode applies to the current block and may be information for selecting one of merge candidates included in a merge candidate list. Among the candidate selection information, the mvp flag or the mvp index may be signaled when the MVP mode applies to the current block and may be information for selecting one of mvp candidates in an mvp candidate list. In addition, the information on the motion information may include information on the above-described MVD and/or reference picture index information. In addition, the information on the motion information may include information specifying whether to apply L0 prediction, L1 prediction or Bi prediction. The residual information is information on the residual samples. The residual information may include information on quantized transform coefficients for the residual samples.

The output bitstream may be stored in a (digital) storage medium and transmitted to the image decoding apparatus or may be transmitted to the image decoding apparatus via a network.

As described above, the image encoding apparatus may generate a reconstructed picture (a picture including reconstructed samples and a reconstructed block) based on the reference samples and the residual samples. This is for the image encoding apparatus to derive the same prediction result as that performed by the image decoding apparatus, thereby increasing coding efficiency. Accordingly, the image encoding apparatus may store the reconstructed picture (or the reconstructed samples and the reconstructed block) in a memory and use the same as a reference picture for inter prediction. As described above, an in-loop filtering procedure is further applicable to the reconstructed picture.

Figure 11:
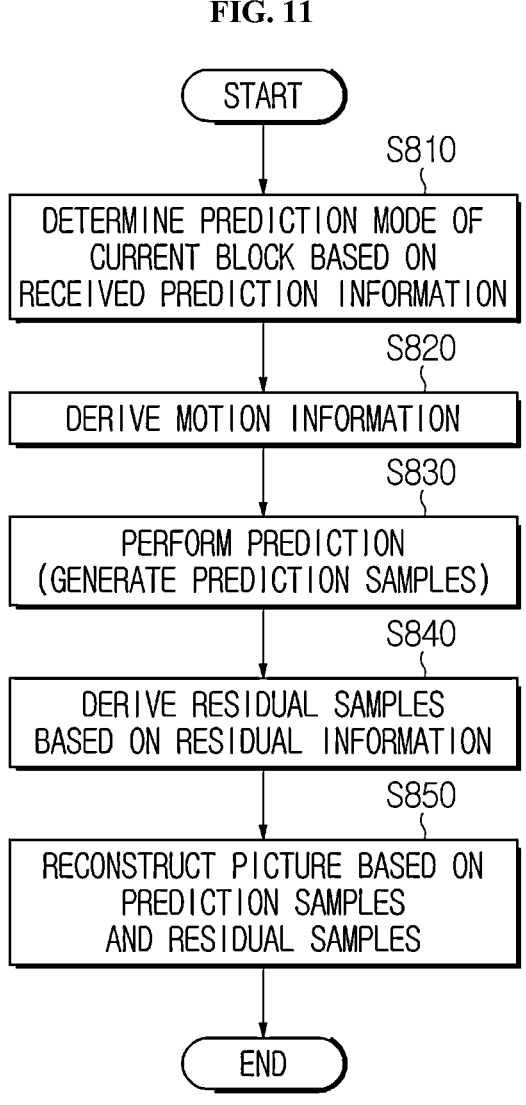
FIG. 11 is a flowchart illustrating an inter prediction based video/image decoding method.

FIG. 11 is a flowchart illustrating an inter prediction based video/image decoding method.

Figure 12:
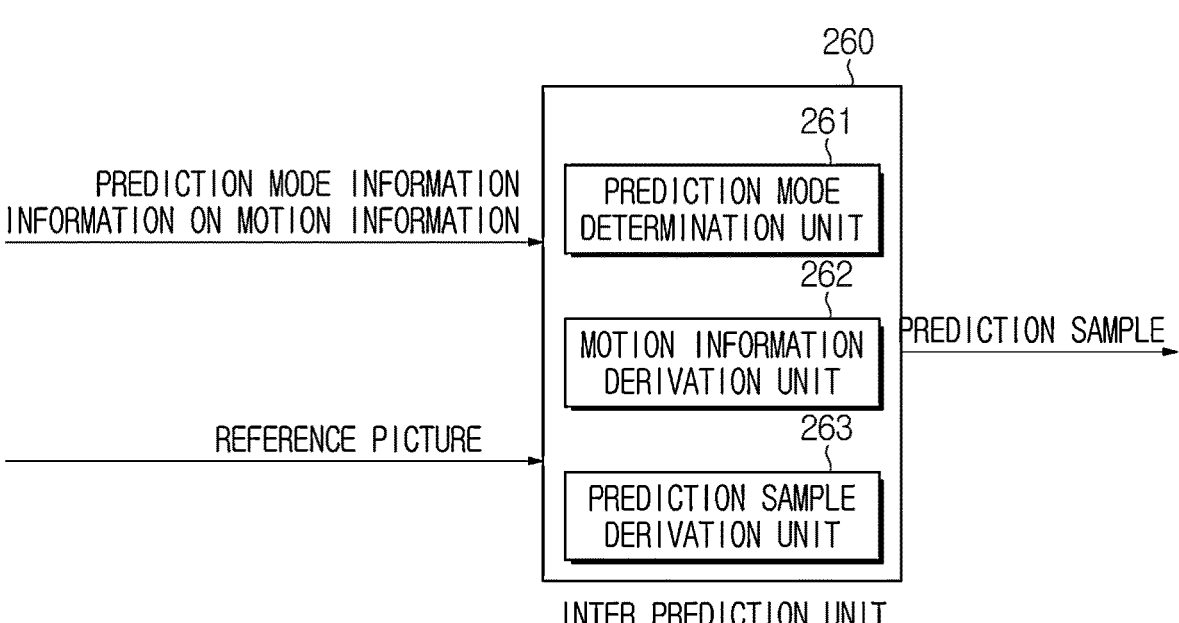
FIG. 12 is a view illustrating the configuration of an inter prediction unit 260 according to the present disclosure.

FIG. 12 is a view illustrating the configuration of an inter prediction unit 260 according to the present disclosure.

The image decoding apparatus may perform operation corresponding to operation performed by the image encoding apparatus. The image decoding apparatus may perform prediction on a current block based on received prediction information and derive prediction samples.

The decoding method of FIG. 11 may be performed by the image decoding apparatus of FIG. 3. Steps S810 to S830 may be performed by the inter prediction unit 260, and the prediction information of step S810 and the residual information of step S840 may be obtained from a bitstream by the entropy decoder 210. The residual processor of the image decoding apparatus may derive residual samples for a current block based on the residual information (S840). Specifically, the dequantizer 220 of the residual processor may perform dequantization based on dequantized transform coefficients derived based on the residual information to derive transform coefficients, and the inverse transformer 230 of the residual processor may perform inverse transform on the transform coefficients to derive the residual samples for the current block. Step S850 may be performed by the adder 235 or the reconstructor.

Specifically, the image decoding apparatus may determine the prediction mode of the current block based on the received prediction information (S810). The image decoding apparatus may determine which inter prediction mode applies to the current block based on the prediction mode information in the prediction information.

For example, it may be determined whether the skip mode applies to the current block based on the skip flag. In addition, it may be determined whether the merge mode or the MVP mode applies to the current block based on the merge flag. Alternatively, one of various inter prediction mode candidates may be selected based on the mode index. The inter prediction mode candidates may include a skip mode, a merge mode and/or an MVP mode or may include various inter prediction modes which will be described below.

The image decoding apparatus may derive the motion information of the current block based on the determined inter prediction mode (S820). For example, when the skip mode or the merge mode applies to the current block, the image decoding apparatus may construct a merge candidate list, which will be described below, and select one of merge candidates included in the merge candidate list. The selection may be performed based on the above-described candidate selection information (merge index). The motion information of the current block may be derived using the motion information of the selected merge candidate. For example, the motion information of the selected merge candidate may be used as the motion information of the current block.

As another example, when the MVP mode applies to the current block, the image decoding apparatus may construct an mvp candidate list and use the motion vector of an mvp candidate selected from among mvp candidates included in the mvp candidate list as an mvp of the current block. The selection may be performed based on the above-described candidate selection information (mvp flag or mvp index). In this case, the MVD of the current block may be derived based on information on the MVD, and the motion vector of the current block may be derived based on mvp and MVD of the current block. In addition, the reference picture index of the current block may be derived based on the reference picture index information. A picture indicated by the reference picture index in the reference picture list of the current block may be derived as a reference picture referenced for inter prediction of the current block.

The image decoding apparatus may generate prediction samples of the current block based on motion information of the current block (S830). In this case, the reference picture may be derived based on the reference picture index of the current block, and the prediction samples of the current block may be derived using the samples of the reference block indicated by the motion vector of the current block on the reference picture. In some cases, a prediction sample filtering procedure may be further performed on all or some of the prediction samples of the current block.

For example, as shown in FIG. 12, the inter prediction unit 260 of the image decoding apparatus may include a prediction mode determination unit 261, a motion information derivation unit 262 and a prediction sample derivation unit 263. In the inter prediction unit 260 of the image decoding apparatus, the prediction mode determination unit 261 may determine the prediction mode of the current block based on the received prediction mode information, the motion information derivation unit 262 may derive the motion information (a motion vector and/or a reference picture index, etc.) of the current block based on the received motion information, and the prediction sample derivation unit 263 may derive the prediction samples of the current block.

The image decoding apparatus may generate residual samples of the current block based the received residual information (S840). The image decoding apparatus may generate the reconstructed samples of the current block based on the prediction samples and the residual samples and generate a reconstructed picture based on this (S850). Thereafter, an in-loop filtering procedure is applicable to the reconstructed picture as described above.

As described above, the inter prediction procedure may include step of determining an inter prediction mode, step of deriving motion information according to the determined prediction mode, and step of performing prediction (generating prediction samples) based on the derived motion information. The inter prediction procedure may be performed by the image encoding apparatus and the image decoding apparatus, as described above.

Hereinafter, the step of deriving the motion information according to the prediction mode will be described in greater detail.

As described above, inter prediction may be performed using motion information of a current block. An image encoding apparatus may derive optimal motion information of a current block through a motion estimation procedure.

For example, the image encoding apparatus may search for a similar reference block with high correlation within a predetermined search range in the reference picture using an original block in an original picture for the current block in fractional pixel unit, and derive motion information using the same. Similarity of the block may be calculated based on a sum of absolute differences (SAD) between the current block and the reference block. In this case, motion information may be derived based on a reference block with a smallest SAD in the search area. The derived motion information may be signaled to an image decoding apparatus according to various methods based on an inter prediction mode.

When a merge mode applies to a current block, motion information of the current block is not directly transmitted and motion information of the current block is derived using motion information of a neighboring block. Accordingly, motion information of a current prediction block may be indicated by transmitting flag information specifying that the merge mode is used and candidate selection information (e.g., a merge index) specifying which neighboring block is used as a merge candidate. In the present disclosure, since the current block is a unit of prediction performance, the current block may be used as the same meaning as the current prediction block, and the neighboring block may be used as the same meaning as a neighboring prediction block.

The image encoding apparatus may search for merge candidate blocks used to derive the motion information of the current block to perform the merge mode. For example, up to five merge candidate blocks may be used, without being limited thereto. The maximum number of merge candidate blocks may be transmitted in a slice header or a tile group header, without being limited thereto. After finding the merge candidate blocks, the image encoding apparatus may generate a merge candidate list and select a merge candidate block with smallest RD cost as a final merge candidate block.

The present disclosure provides various embodiments for the merge candidate blocks configuring the merge candidate list. The merge candidate list may use, for example, five merge candidate blocks. For example, four spatial merge candidates and one temporal merge candidate may be used.

Figure 13:
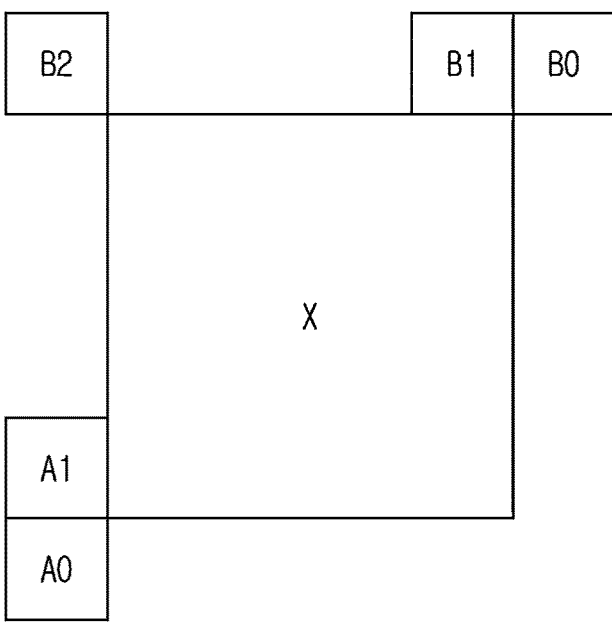
FIG. 13 is a view illustrating neighboring blocks available as a spatial merge candidate according to an embodiment.

FIG. 13 is a view illustrating neighboring blocks available as a spatial merge candidate.

FIG. 14 is a view schematically illustrating a merge candidate list construction method according to an example of the present disclosure.

An image encoding/decoding apparatus may insert, into a merge candidate list, spatial merge candidates derived by searching for spatial neighboring blocks of a current block (S1110). For example, as shown in FIG. 13, the spatial neighboring blocks may include a bottom-left corner neighboring block $A_0$, a left neighboring block $A_1$, a top-right corner neighboring block $B_0$, a top neighboring block $B_1$, and a top-left corner neighboring block $B_2$ of the current block. However, this is an example and, in addition to the above-described spatial neighboring blocks, additional neighboring blocks such as a right neighboring block, a bottom neighboring block and a bottom-right neighboring block may be further used as the spatial neighboring blocks. The image encoding/decoding apparatus may detect available blocks by searching for the spatial neighboring blocks based on priority and derive motion information of the detected blocks as the spatial merge candidates. For example, the image encoding/decoding apparatus may construct a merge candidate list by searching for the five blocks shown in FIG. 13 in order of $A_1$, $B_1$, $B_0$, $A_0$ and $B_2$ and sequentially indexing available candidates.

The image encoding/decoding apparatus may insert, into the merge candidate list, a temporal merge candidate derived by searching for temporal neighboring blocks of the current block (S1120). The temporal neighboring blocks may be located on a reference picture which is different from a current picture in which the current block is located. A reference picture in which the temporal neighboring block is located may be referred to as a collocated picture or a col picture. The temporal neighboring block may be searched for in order of a bottom-right corner neighboring block and a bottom-right center block of the co-located block for the current block on the col picture. Meanwhile, when applying motion data compression in order to reduce memory load, specific motion information may be stored as representative motion information for each predetermined storage unit for the col picture. In this case, motion information of all blocks in the predetermined storage unit does not need to be stored, thereby obtaining motion data compression effect. In this case, the predetermined storage unit may be predetermined as, for example, 16×16 sample unit or 8×8 sample unit or size information of the predetermined storage unit may be signaled from the image encoding apparatus to the image decoding apparatus. When applying the motion data compression, the motion information of the temporal neighboring block may be replaced with the representative motion information of the predetermined storage unit in which the temporal neighboring block is located. That is, in this case, from the viewpoint of implementation, the temporal merge candidate may be derived based on the motion information of a prediction block covering an arithmetic left-shifted position after an arithmetic right shift by a predetermined value based on coordinates (top-left sample position) of the temporal neighboring block, not a prediction block located on the coordinates of the temporal neighboring block. For example, when the predetermined storage unit is a $2^n \times 2^n$ sample unit and the coordinates of the temporal neighboring block are (xTnb, yTnb), the motion information of a prediction block located at a modified position $((xTnb >> n) << n), (yTnb >> n) << n))$ may be used for the temporal merge candidate. Specifically, for example, when the predetermined storage unit is a 16×16 sample unit and the coordinates of the temporal neighboring block are (xTnb, yTnb), the motion information of a prediction block located at a modified position $((xTnb >> 4) << 4), (yTnb >> 4) << 4))$ may be used for the temporal merge candidate. Alternatively, for example, when the predetermined storage unit is an 8×8 sample unit and the coordinates of the temporal neighboring block are (xTnb, yTnb), the motion information of a prediction block located at a modified position $((xTnb >> 3) << 3), (yTnb >> 3) << 3))$ may be used for the temporal merge candidate.

Referring to FIG. 14 again, the image encoding/decoding apparatus may check whether the number of current merge candidates is less than a maximum number of merge candidates (S1130). The maximum number of merge candidates may be predefined or signaled from the image encoding apparatus to the image decoding apparatus. For example, the image encoding apparatus may generate and encode information on the maximum number of merge candidates and transmit the encoded information to the image decoding apparatus in the form of a bitstream. When the maximum number of merge candidates is satisfied, a subsequent candidate addition process S1140 may not be performed.

When the number of current merge candidates is less than the maximum number of merge candidates as a checked result of step S1130, the image encoding/decoding apparatus may derive an additional merge candidate according to a predetermined method and then insert the additional merge candidate to the merge candidate list (S1140).

When the number of current merge candidates is not less than the maximum number of merge candidates as a checked result of step S1130, the image encoding/decoding apparatus may end the construction of the merge candidate list. In this case, the image encoding apparatus may select an optimal merge candidate from among the merge candidates config- uring the merge candidate list, and signal candidate selection information (e.g., merge index) specifying the selected merge candidate to the image decoding apparatus. The image decoding apparatus may select the optimal merge candidate based on the merge candidate list and the candi- date selection information.

The motion information of the selected merge candidate may be used as the motion information of the current block, and the prediction samples of the current block may be derived based on the motion information of the current block, as described above. The image encoding apparatus may derive the residual samples of the current block based on the prediction samples and signal residual information of the residual samples to the image decoding apparatus. The image decoding apparatus may generate reconstructed samples based on the residual samples derived based on the residual information and the prediction samples and gener- ate the reconstructed picture based on the same, as described above.

When applying a skip mode to the current block, the motion information of the current block may be derived using the same method as the case of applying the merge mode. However, when applying the skip mode, a residual signal for a corresponding block is omitted and thus the prediction samples may be directly used as the reconstructed samples.

When applying an MVP mode to the current block, a motion vector predictor (mvp) candidate list may be gener- ated using a motion vector of reconstructed spatial neigh- boring blocks (e.g., the neighboring blocks shown in FIG. 13) and/or a motion vector corresponding to the temporal neighboring blocks (or Col blocks). That is, the motion vector of the reconstructed spatial neighboring blocks and the motion vector corresponding to the temporal neighbor- ing blocks may be used as motion vector predictor candi- dates of the current block. When applying bi-prediction, an mvp candidate list for L0 motion information derivation and an mvp candidate list for L1 motion information derivation are individually generated and used. Prediction information (or information on prediction) of the current block may include candidate selection information (e.g., an MVP flag or an MVP index) specifying an optimal motion vector predictor candidate selected from among the motion vector predictor candidates included in the mvp candidate list. In this case, a prediction unit may select a motion vector predictor of a current block from among the motion vector predictor candidates included in the mvp candidate list using the candidate selection information. The prediction unit of the image encoding apparatus may obtain and encode a motion vector difference (MVD) between the motion vector of the current block and the motion vector predictor and output the encoded MVD in the form of a bitstream. That is, the MVD may be obtained by subtracting the motion vector predictor from the motion vector of the current block. The prediction unit of the image decoding apparatus may obtain a motion vector difference included in the information on prediction and derive the motion vector of the current block through addition of the motion vector difference and the motion vector predictor. The prediction unit of the image encoding apparatus may obtain or derive a reference picture index specifying a reference picture from the information on prediction.

FIG. 15 is a view schematically illustrating a motion vector predictor candidate list construction method accord- ing to an example of the present disclosure.

First, a spatial candidate block of a current block may be searched for and available candidate blocks may be inserted into an mvp candidate list (S1210). Thereafter, it is deter- mined whether the number of mvp candidates included in the mvp candidate list is less than 2 (S1220) and, when the number of mvp candidates is two, construction of the mvp candidate list may be completed.

In step S1220, when the number of available spatial candidate blocks is less than 2, a temporal candidate block of the current block may be searched for and available candidate blocks may be inserted into the mvp candidate list (S1230). When the temporal candidate blocks are not avail- able, a zero motion vector may be inserted into the mvp candidate list, thereby completing construction of the mvp candidate list.

Meanwhile, when applying an mvp mode, a reference picture index may be explicitly signaled. In this case, a reference picture index refidxL0 for L0 prediction and a reference picture index refidxL1 for L1 prediction may be distinguishably signaled. For example, when applying the MVP mode and applying Bi prediction, both information on refidxL0 and information on refidxL1 may be signaled.

As described above, when applying the MVP mode, information on MVP derived by the image encoding appa- ratus may be signaled to the image decoding apparatus. Information on the MVD may include, for example, infor- mation specifying x and y components for an absolute value (MVD absolute value) and a sign of the MVD. In this case, when the MVD absolute value is greater than 0, whether the MVD absolute value is greater than 1 and information specifying an MVD remainder may be signaled stepwise. For example, information specifying whether the MVD absolute value is greater than 1 may be signaled only when a value of flag information specifying whether the MVD absolute value is greater than 0 is 1.

FIG. 16 is a view illustrating a syntax structure for transmitting MVD from an image encoding apparatus to an image decoding apparatus according to an embodiment of the present disclosure.

In FIG. 16, abs_mvd_greater0_flag[0] specifies whether the absolute value of the x component of MVD is greater than 0, and abs_mvd_greater0_flag[1] specifies the absolute value of the y component of MVD is greater than 0. Similarly, abs_mvd_greater1_flag[0] specifies whether the absolute value of the x component of MVD is greater than 1, and abs_mvd_greater1_flag[1] specifies whether the abso- lute value of the y component of MVD is greater than 1. As shown in FIG. 16, abs_mvd_greater1_flag may be transmit- ted only when abs_mvd_greater0_flag is 1. In FIG. 16, abs_mvd_minus2 may specify a value obtained by subtract- ing 2 from the absolute value of MVD, and mvd_sign_flag specify whether the sign of MVD is positive or negative. Using the syntax structure shown in FIG. 16, MVD may be derived as shown in Equation 1 below.

[Equation 1]

$$MVD[compIdx] = \text{abs\_mvd\_greater0\_flag}[compIdx] *$$

$$(\text{abs\_mvd\_minus2}[compIdx] + 2 * (1 - 2 * \text{mvd\_sign\_flag}[compIdx])) \quad 5$$

Meanwhile, MVD (MVDL0) for L0 prediction and MVD (MVDL1) for L1 prediction may be distinguishably signaled, and the information on MVD may include information on MVDL0 and/or information on MVDL1. For example, when applying the MVP mode and applying BI prediction to the current block, both the information on MVDL0 and the information on MVDL1 may be signaled.

Overview of Intra Block Copy (IBC) Prediction

Hereinafter, IBC prediction according to the present disclosure will be described.

IBC prediction may be performed by a prediction unit of an image encoding/decoding apparatus. IBC prediction may be simply referred to as IBC. The IBC may be used for content image/moving image coding such as screen content coding (SCC). The IBC prediction may be basically performed in the current picture, but may be performed similarly to inter prediction in that a reference block is derived within the current picture. That is, IBC may use at least one of inter prediction techniques described in the present disclosure. For example, IBC may use at least one of the above-described motion information (motion vector) derivation methods. At least one of the inter prediction techniques may be partially modified and used in consideration of the IBC prediction. The IBC may refer to a current picture and thus may be referred to as current picture referencing (CPR).

For IBC, the image encoding apparatus may perform block matching (BM) and derive an optimal block vector (or motion vector) for a current block (e.g., a CU). The derived block vector (or motion vector) may be signaled to the image decoding apparatus through a bitstream using a method similar to signaling of motion information (motion vector) in the above-described inter prediction. The image decoding apparatus may derive a reference block for the current block in the current picture through the signaled block vector (motion vector), and derive a prediction signal (predicted block or prediction samples) for the current block through this. Here, the block vector (or motion vector) may specify displacement from the current block to a reference block located in an already reconstructed area in the current picture. Accordingly, the block vector (or the motion vector) may be referred to a displacement vector. Hereinafter, in IBC, the motion vector may correspond to the block vector or the displacement vector. The motion vector of the current block may include a motion vector (luma motion vector) for a luma component or a motion vector (chroma motion vector) for a chroma component. For example, the luma motion vector for an IBC-coded CU may be an integer sample unit (that is, integer precision). The chroma motion vector may be clipped in integer sample units. As described above, IBC may use at least one of inter prediction techniques, and, for example, the luma motion vector may be encoded/decoded using the above-described merge mode or MVP mode.

When applying a merge mode to the luma IBC block, a merge candidate list for the luma IBC block may be constructed similarly to a merge candidate list in the inter mode described with reference to FIG. 14. However, in the case of the luma IBC block, a temporal neighboring block may not be used as a merge candidate.

When applying the MVP mode to the luma IBC block, an mvp candidate list for the luma IBC block may be constructed similarly to the mvp candidate list in the inter mode described with reference to FIG. 15. However, in the case of the luma IBC block, a temporal candidate block may not be used as the mvp candidate.

In IBC, a reference block is derived from the already reconstructed area in the current picture. In this case, in order to reduce memory consumption and complexity of the image decoding apparatus, only a predefined area among already reconstructed areas in the current picture may be referenced. The predefined area may include a current CTU in which the current block is included. By restricting referenceable reconstructed area to the predefined area, the IBC mode may be implemented in hardware using a local on-chip memory.

The image encoding apparatus for performing IBC may search the predefined area to determine a reference block with smallest RD cost and derive a motion vector (block vector) based on the positions of the reference block and the current block.

Whether to apply IBC to the current block may be signaled as IBC performance information at a CU level. Information on a signaling method (IBC MVP mode or IBC skip/merger mode) of the motion vector of the current block may be signaled. IBC performance information may be used to determine the prediction mode of the current block. Accordingly, the IBC performance information may be included in information on the prediction mode of the current block.

In the case of the IBC skip/merge mode, a merge candidate index may be signaled to specify a block vector to be used for prediction of the current luma block among block vectors included in the merge candidate list. In this case, the merge candidate list may include IBC-encoded neighboring blocks. The merge candidate list may be configured to include spatial merge candidates and not to include temporal merge candidates. In addition, the merge candidate list may further include history-based motion vector predictor (HMVP) candidates and/or pairwise candidates.

In the case of the IBC MVP mode, a block vector difference value may be encoded using the same method as a motion vector difference value of the above-described inter mode. The block vector prediction method may construct and use an mvp candidate list including two candidates as predictors similarly to the MVP mode of the inter mode. One of the two candidates may be derived from a left neighboring block and the other candidate may be derived from a top neighboring block. In this case, only when the left or top neighboring block is IBC-encoded, candidates may be derived from the corresponding neighboring block. If the left or top neighboring block is not available, for example, is not IBC-encoded, a default block vector may be included in the mvp candidate list as a predictor. In addition, information (e.g., flag) specifying one of two block vector predictors is signaled and used as candidate selection information similarly to the MVP mode of the inter mode. The mvp candidate list may include an HMVP candidate and/or a zero motion vector as the default block vector.

The HMVP candidate may be referred to as a history-based MVP candidate, and an MVP candidate used before encoding/decoding of the current block, a merge candidate or a block vector candidate may be stored in an HMVP list as HMVP candidates. Thereafter, when the merge candidate list of the current block or the mvp candidate list does not include a maximum number of candidates, candidates stored in the HMVP list may be added to the merge candidate list or mvp candidate list of the current block as HMVP candidates.

The pairwise candidate means a candidate derived by selecting two candidates according to a predetermined order from among candidates already included in the merge candidate list of the current block and averaging the selected two candidates.

FIG. 17 is a flowchart illustrating an IBC based video/image encoding method.

Figure 18:
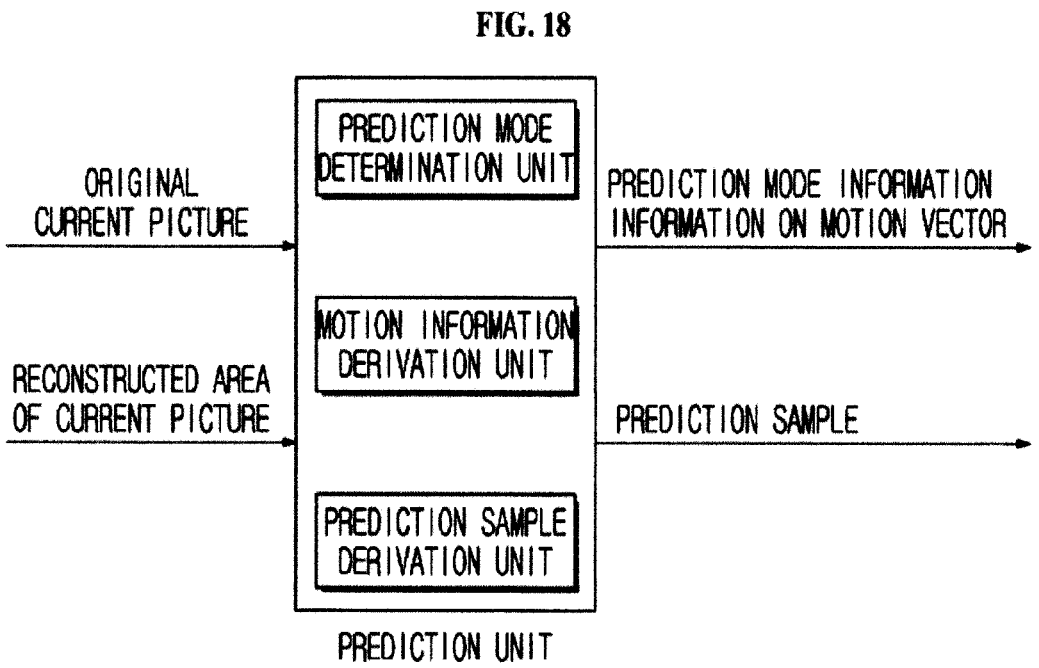
FIG. 18 is a view illustrating the configuration of a prediction unit for performing an IBC based video/image encoding method according to an embodiment.

FIG. 18 is a view illustrating the configuration of a prediction unit for performing an IBC based video/image encoding method according to the present disclosure.

The encoding method of FIG. 17 may be performed by the image encoding apparatus of FIG. 2. Specifically, step S1410 may be performed by the prediction unit and step S1420 may be performed by the residual processor. Specifically, step S1420 may be performed by the subtractor 115. Step S1430 may be performed by the entropy encoder 190. The prediction information of step S1430 may be derived by the prediction unit and the residual information of step S1430 may be derived by the residual processor. The residual information is information on the residual samples. The residual information may include information on quantized transform coefficients for the residual samples. As described above, the residual samples may be derived by the transform coefficients through the transformer 120 of the image encoding apparatus, and the transform coefficients may be derived by transform coefficients quantized through the quantizer 130. Information on the quantized transform coefficients may be encoded by the entropy encoder 190 through a residual coding procedure.

The image encoding apparatus may perform IBC prediction (IBC based prediction) for the current block (S1410). The image encoding apparatus may derive a prediction mode and motion vector (block vector) of the current block and generate prediction samples of the current block. The prediction mode may include at least one of the above-described inter prediction modes. Here, prediction mode determination, motion vector derivation and prediction samples generation procedures may be simultaneously performed or any one procedure may be performed before the other procedures. For example, as shown in FIG. 18, the prediction unit of the image encoding apparatus for performing an IBC-based video/image encoding method may include a prediction mode determination unit, a motion vector derivation unit and a prediction sample derivation unit. The prediction mode determination unit may determine the prediction mode of the current block, the motion vector derivation unit may derives the motion vector of the current block, and the prediction sample derivation unit may derive the prediction samples of the current block. For example, the prediction unit of the image encoding apparatus may search for a block similar to the current block in a reconstructed area (or a certain area (search area) of the reconstructed area) of a current picture and derive a reference block whose a difference from the current block is equal to or less than a certain criterion or a minimum. The image encoding apparatus may derive a motion vector based on a displacement difference between the reference block and the current block. The image encoding apparatus may determine a mode applying to the current block among various prediction modes. The image encoding apparatus may compare RD costs for the various prediction modes and determine an optimal prediction mode for the current block. However, a method of determining the prediction mode for the current block by the image encoding apparatus is not limited to the above example and various methods may be used.

For example, when applying a skip mode or a merge mode to the current block, the image encoding apparatus may derive merge candidates from neighboring blocks of the current block and construct a merge candidate list using the derived merge candidates. In addition, the image encoding apparatus may derive a reference block whose a difference from the current block is equal to or less than a certain criterion or a minimum among reference blocks indicated by the merge candidates included in the merge candidate list. In this case, a merge candidate associated with the derived reference block may be selected and merge index information specifying the selected merge candidate may be generated and signaled to the image decoding apparatus. Using the motion vector of the selected merge candidate, the motion vector of the current block may be derived.

As another example, when applying an MVP mode to the current block, the image encoding apparatus may derive motion vector predictor (mvp) candidates from the neighboring blocks of the current block and construct an mvp candidate list using the derived mvp candidates. In addition, the image encoding apparatus may use the motion vector of the mvp candidate selected from among the mvp candidates included in the mvp candidate list as the mvp of the current block. In this case, for example, a motion vector indicating a reference block derived by the above-described motion estimation may be used as the motion vector of the current block, and an mvp candidate having a smallest difference from the motion vector of the current block among the mvp candidates may become the selected mvp candidate. A motion vector difference (MVD) which is obtained by subtracting the mvp from the motion vector of the current block may be derived. In this case, index information specifying the selected mvp candidate and information on the MVD may be signaled to the image decoding apparatus.

The image encoding apparatus may derive residual samples based on the prediction samples (S1420). The image encoding apparatus may derive the residual samples through comparison between the original samples of the current block and the prediction samples. For example, the residual sample may be derived by subtracting the corresponding prediction sample from the original sample.

The image encoding apparatus may encode image information including prediction information and residual information (S1430). The image encoding apparatus may output the encoded image information in the form of a bitstream. The prediction information may include prediction mode information (e.g., skip flag, merge flag or mode index) and information on a motion vector as information related to the prediction procedure. Among the prediction mode information, the skip flag specifies whether to apply the skip mode to the current block and the merge flag specifies whether to apply the merge mode to the current block. Alternatively, the prediction mode information may specify one of a plurality of prediction modes, such as a mode index. When the skip flag and the merge flag are 0, it may be determined that the MVP mode applies to the current block. The information on the motion vector may include candidate selection information (e.g., merge index, mvp flag or mvp index) which is information for deriving the motion vector. Among the candidate selection information, the merge index may be signaled when applying the merge mode to the current block and may be information for selecting one of the merge candidates included in the merge candidate list. Among the candidate selection information, the mvp flag or mvp index may be signaled when applying the MVP mode to the current block and may be information for selecting one of the mvp candidates included in the mvp candidate list. In addition, the information on the motion vector may include information on the above-described MVD. In addition, the information on the motion vector may include information specifying whether to apply L0 prediction, L1 prediction or bi prediction. The residual information is information on the residual samples. The residual information may include information on the quantized transform coefficients for the residual samples.

The output bitstream may be stored in a (digital) storage medium and transmitted to the image decoding apparatus or may be transmitted to the image decoding apparatus through a network.

Meanwhile, as described above, the image encoding apparatus may generate a reconstructed picture (picture including reconstructed samples and a reconstructed block) based on the reference samples and the residual samples. This is for the image encoding apparatus to derive the same prediction result as that performed by the image decoding apparatus, thereby increasing coding efficiency. Accordingly, the image encoding apparatus may store the reconstructed picture (or reconstructed samples and reconstructed block) in a memory and use the same as a reference picture for inter prediction. An in-loop filtering procedure is further applicable to the reconstructed picture, as described above.

Figure 19:
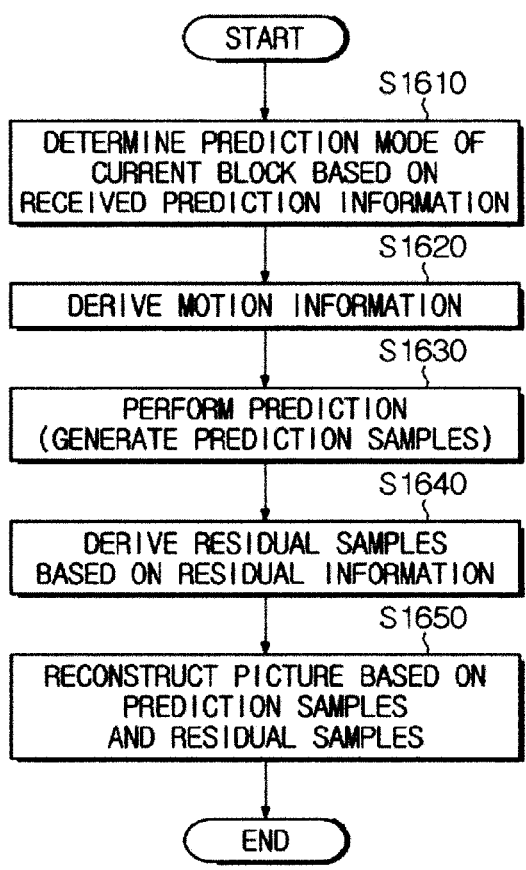
FIG. 19 is a flowchart illustrating an IBC based video/image decoding method according to an embodiment.

FIG. 19 is a flowchart illustrating an IBC based video/image decoding method.

Figure 20:
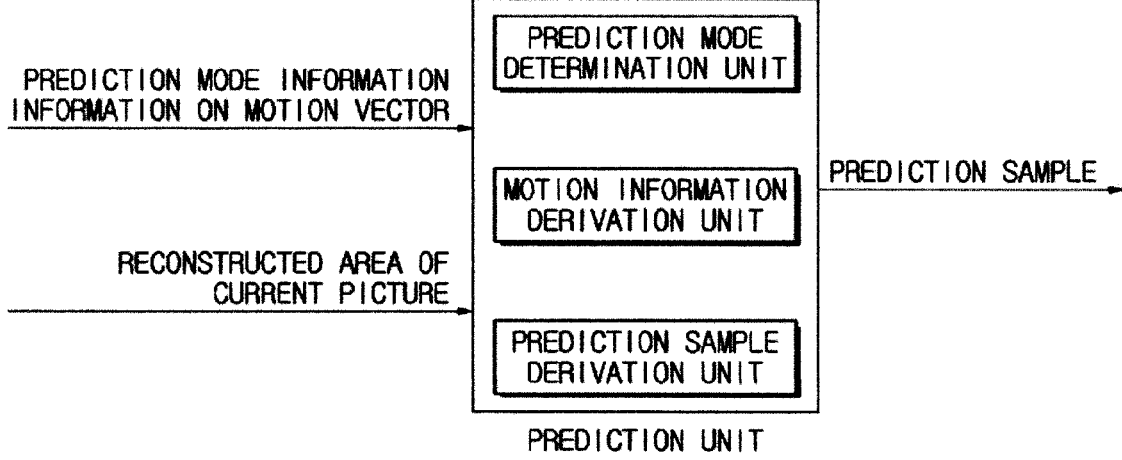
FIG. 20 is a view illustrating a configuration of a prediction unit for performing an IBC based video/image decoding method according to an embodiment.

FIG. 20 is a view illustrating a configuration of a prediction unit for performing an IBC based video/image decoding method according to the present disclosure.

The image decoding apparatus may perform operation corresponding to operation performed by the image encoding apparatus. The image decoding apparatus may perform IBC prediction for a current block based on received prediction information to derive prediction samples.

The decoding method of FIG. 19 may be performed by the image decoding apparatus of FIG. 3. Steps S1610 to S1630 may be performed by the prediction unit and the prediction information of step S1610 and the residual information of step S1640 may be obtained from a bitstream by the entropy decoder 210. The residual processor of the image decoding apparatus may derive residual samples for the current block based on the residual information (S1640). Specifically, the dequantizer 220 of the residual processor may perform dequantization based on the quantized transform coefficient derived based on the residual information to derive transform coefficients, and the inverse transformer 230 of the residual processor may perform inverse transform on the transform coefficients to derive residual samples for the current block. Step S1650 may be performed by the adder 235 or the reconstructor.

Specifically, the image decoding apparatus may determine the prediction mode of the current block based on the received prediction information (S1610). The image decoding apparatus may determine which prediction mode applies to the current block based on the prediction mode information in the prediction information.

For example, it may be determined whether to apply the skip mode to the current block based on the skip flag. In addition, it may be determined whether to apply the merge node or MVP mode to the current block based on the merge flag. Alternatively, one of various prediction mode candidates may be selected based on the mode index. The prediction mode candidates may include a skip mode, a merge mode and/or an MVP mode or may include the above-described various inter prediction modes.

The image encoding apparatus may derive the motion vector of the current block based on the determined prediction mode (S1620). For example, when applying the skip mode or the merge mode to the current block, the image decoding apparatus may construct the above-described merge candidate list and select one of the merge modes included in the merge candidate list. The selection may be performed based on the above-described candidate selection information (merge index). The motion vector of the current block may be derived using the motion vector of the selected merge candidate. For example, the motion vector of the selected merge candidate may be used as the motion vector of the current block.

As another example, when applying the MVP mode to the current block, the image decoding apparatus may construct an mvp candidate list and use the motion vector of the mvp candidate selected from among the mvp candidates included in the mvp candidate list as the mvp of the current block. The selection may be performed based on the above-described candidate selection information (mvp flag or mvp index). In this case, the MVD of the current block may be derived based on information on the MVD, and the motion vector of the current block may be derived based on the mvp and MVD of the current block.

The image decoding apparatus may generate prediction samples of the current block based on the motion vector of the current block (S1630). The prediction samples of the current block may be derived using the samples of the reference block indicated by the motion vector of the current block on the current picture. In some cases, a prediction sample filtering procedure for all or some of the prediction samples of the current block may be further performed.

For example, as shown in FIG. 20, the prediction unit of the image decoding apparatus for performing an IBC based video/image decoding method may include a prediction mode determination unit, a motion vector derivation unit and a prediction sample derivation unit. The prediction unit of the image decoding apparatus may determine the prediction mode for the current block based on the received prediction mode information in the prediction mode determination unit, derive the motion vector of the current block based on the received information on the motion vector in the motion vector derivation unit, and derive the prediction samples of the current block in the prediction sample derivation unit.

The image decoding apparatus may generate residual samples of the current block based on the received residual information (S1640). The image decoding apparatus may generate reconstructed samples for the current block based on the prediction samples and the residual samples, and generate a reconstructed picture based on this (S1650). Thereafter, an in-loop filtering procedure is further applicable to the reconstructed picture, as described above.

As described above, one unit (e.g., a coding unit (CU)) may include a luma block (luma coding block (CB)) and a chroma block (chroma CB). In this case, the luma block and the chroma block corresponding thereto may have the same motion information (e.g., motion vector) or different motion information. For example, the motion information of the chroma block may be derived based on the motion information of the luma block, such that the luma block and the chroma block corresponding thereto have the same motion information.

Encoding Efficiency Deterioration of 2×N and N×2 Blocks

As described above for block splitting, in an embodiment, when the size of a CTU is 128 based on a luma sample length, the size of the CU may be from 128×128 which is the same size as the CTU to 4×4. When a current color format is a 4:2:0 color format, the size of the chroma block may be from 64×64 to 2×2.

Meanwhile, in the case of a CU to which a dual tree structure in an I slice/tile group applies, when the width or height of the chroma block is less than 4, compression efficiency of the chroma block increases, but complexity significantly increases in a process of encoding and decoding the chroma block. Therefore, throughput degradation and latency problems occur.

Accordingly, in order to reduce encoding and decoding complexity, an image needs to be encoded and decoded by partially limiting the width and height of the chroma block. Hereinafter, a method of performing encoding and decoding by limiting the minimum height and width of a chroma block to a unit of 4 pixels will be described. Furthermore, a method of deriving a motion vector to perform an IBC mode based on a 4×4 chroma block instead of a 2×2 chroma block when the prediction mode of the current block is an IBC mode by limiting the size of the chroma block will be described.

Embodiment 1

As described above, the minimum width or height of the chroma block needs to be limited to a length of four samples. An encoding/decoding apparatus according to an embodiment may determine whether a predetermined splitting mode is allowed for a current block based on whether a current block is a chroma block or the width or height of the current block. Hereinafter, the decoding apparatus will be described, but the following description is correspondingly applicable to the encoding apparatus.

Figure 21:
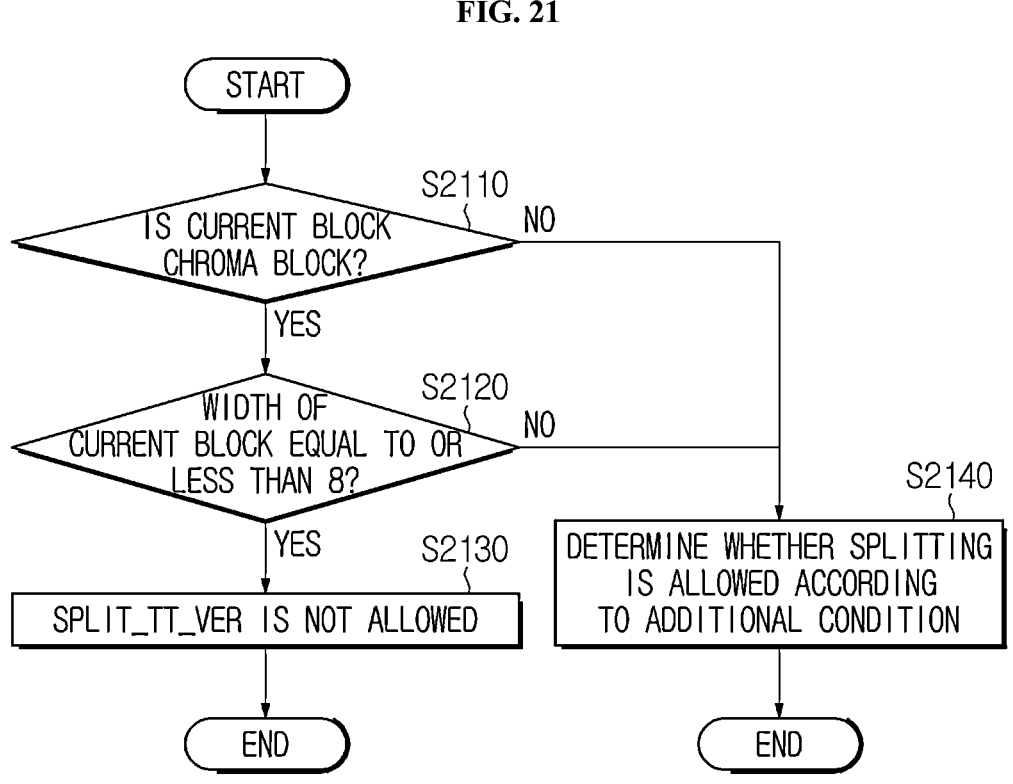
FIG. 21 is a view illustrating a method of determining whether a vertical ternary split (SPLIT_TT_VER) is allowed for a current block by a decoding apparatus according to an embodiment.

FIG. 21 is a view illustrating a method of determining whether vertical ternary splitting (SPLIT_TT_VER) is allowed for a current block by a decoding apparatus. The decoding apparatus according to an embodiment may determine whether the current block is a chroma block (S2110). The decoding apparatus may check a value of a cIdx parameter specifying a color component of the current block to determine whether the current block is a chroma block. The decoding apparatus may determine that the current block is a luma block when the value of cIdx is 0. The decoding apparatus may determine that the current block is a chroma block when the value of cIdx is greater than 0. More specifically, the decoding apparatus may determine that the current block is a chroma cb block when the value of cIdx is 1 or 2. The decoding apparatus may determine that the current block is a chroma cr block when the value of cIdx is 2.

Next, the decoding apparatus may determine whether the width of the current block is equal to or less than a length of 8 samples (S2120). The decoding apparatus may determine that the width of the current block is equal to or less than 8, when the value of a parameter specifying the width of the current block is equal to or less than 8.

Meanwhile, in the case of the chroma block, the width of the chroma block may be determined based on the width of the corresponding luma block. In this case, the width of the current chroma block may be determined based on the width of the luma block and the color format of the current image. For example, when the color format is 4:4:4, the width and height of the chroma block may be set to the width and height of the luma block, respectively. When the color format is 4:2:2, the width of the chroma block may be set to half the width of the luma block and the height of the chroma block may be set to that of the luma block. When the color format is 4:2:0, the width of the chroma block may be set to half the width of the luma block and the height of the chroma block may be set to half the height of the luma block.

Accordingly, when the color format of the current block is 4:4:4, the decoding apparatus may perform step S2120 by determining whether the width of the luma block is equal to or less than 8. Similarly, when the color format of the current block is 4:2:2 or 4:2:0, the decoding apparatus may perform step S2120 by determining whether the width of the luma block is equal to or less than 16.

Finally, when the current block is a chroma block and the width is equal to or less than 8, the decoding apparatus may determine that vertical ternary splitting is not allowed for the current block (S2130).

Meanwhile, when the above conditions are not satisfied, the decoding apparatus may determine that vertical ternary splitting is allowed for the current block. In this case, the decoding apparatus may determine whether vertical ternary splitting is allowed for the current block (S2140), by determining an additional condition that the current block cannot be split by vertical ternary splitting. For example, the decoding apparatus may determine that vertical ternary splitting is not allowed for the current block when the number of times of splitting the current block from a quadtree leaf node is equal to or greater than a value of MaxMttDepth which is a parameter specifying a maximum allowed hierarchy depth of a multitype tree split from the quadtree leaf node, and determine that vertical ternary splitting is allowed for the current block when the number of times of splitting the current block is less than the value of MaxMttDepth.

Embodiment 2

As described above, the minimum width or height of the chroma block needs to be limited to a length of four samples. Hereinafter, a method of limiting horizontal ternary splitting for a current block by an encoding/decoding apparatus according to an embodiment will be described with reference to FIG. 22.

Figure 22:
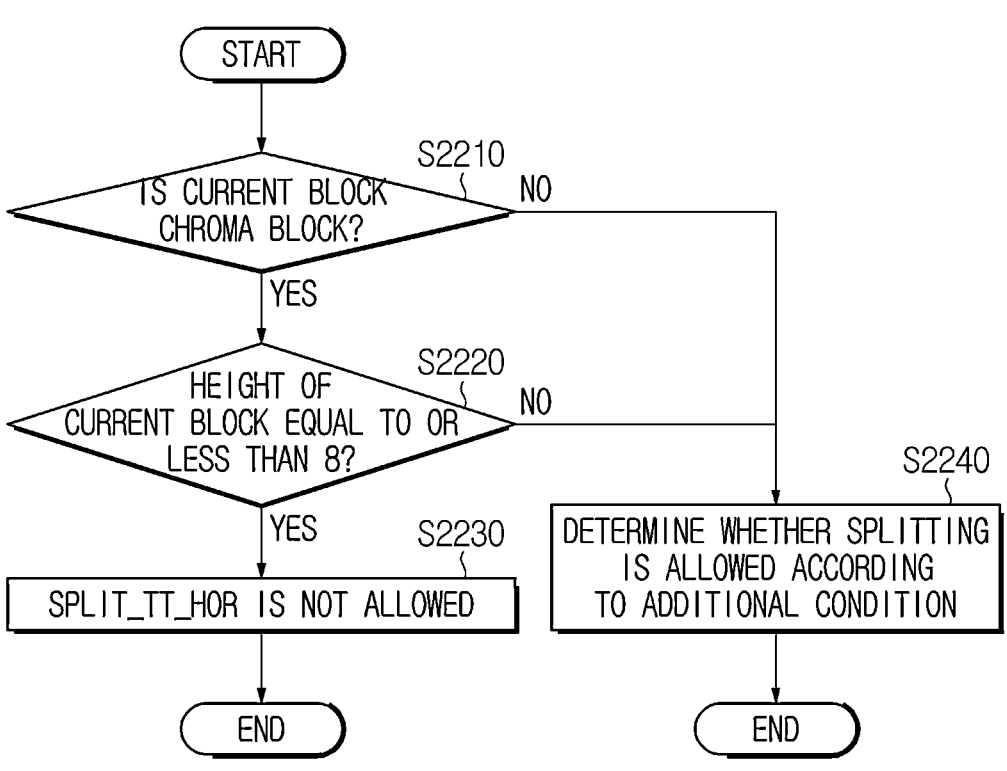
FIG. 22 is a view illustrating a method of determining whether a horizontal ternary split (SPLIT_TT_HOR) is allowed for a current block by a decoding apparatus according to an embodiment.

FIG. 22 is a view illustrating a method of determining whether horizontal ternary splitting (SPLIT_TT_HOR) is allowed for a current block by a decoding apparatus. The decoding apparatus according to an embodiment may determine whether a current block is a chroma block (S2210). The decoding apparatus may check a value of a cIdx parameter specifying a color component of the current block to determine whether the current block is a chroma block, as described above.

Next, the decoding apparatus according to an embodiment may determine whether the height of the current block is equal to or less than a length of 8 samples (S2220). The decoding apparatus may determine that the height of the current block is equal to or less than 8, when the value of a parameter specifying the height of the current block is equal to or less than 8. Alternatively, the decoding apparatus may perform step S2220 based on the height of the luma block is equal to or less than 8 or 16 according to the color format of the current block, as described above.

As described above, in the case of the chroma block, the height of the chroma block may be determined based on the height of the corresponding luma block. For example, when the color format of the current block is 4:4:4 or 4:2:2, the decoding apparatus may perform step S2220 by determining whether the height of the luma block is equal to or less than 8. Similarly, when the color format of the current block is 4:2:2, the decoding apparatus may perform step S2220 by determining whether the height of the luma block is equal to or less than 16.

Finally, when the current block is a chroma block and the height is equal to or less than 8, the decoding apparatus may determine that horizontal ternary splitting is not allowed for the current block (S2230).

Meanwhile, when the above conditions are not satisfied, the decoding apparatus may determine that horizontal ternary splitting is allowed for the current block. In this case, the decoding apparatus may determine whether horizontal ternary splitting is allowed for the current block (S2140), by determining an additional condition that horizontal ternary splitting is not allowed for the current block, as described above. For example, the decoding apparatus may determine that horizontal ternary splitting is not allowed for the current block when the number of times of splitting the current block from a quadtree leaf node is equal to or greater than a value of MaxMttDepth which is a parameter specifying a maximum allowed hierarchy depth of a multitype tree split from the quadtree leaf node, and determine that horizontal ternary splitting is allowed for the current block when the number of times of splitting the current block is less than the value of MaxMttDepth.

Embodiment 3

As described above, the minimum width or height of the chroma block needs to be limited to a length of four samples. Hereinafter, a method of limiting horizontal binary splitting of a current block by an encoding/decoding apparatus according to an embodiment will be described with reference to FIG. 23.

Figure 23:
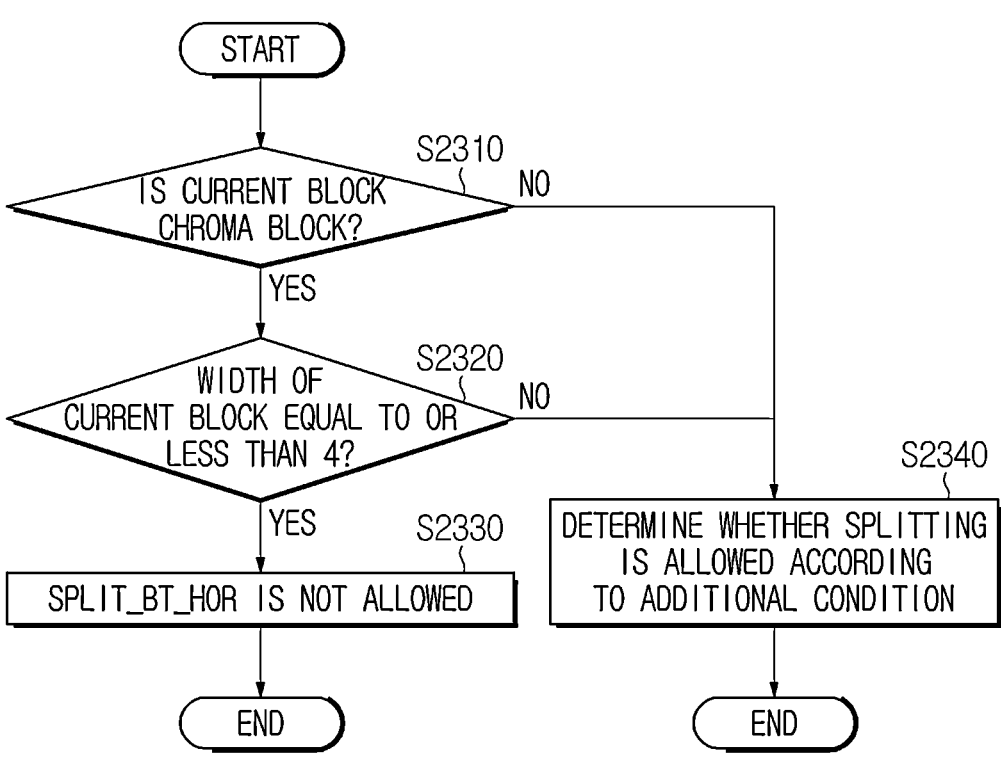
FIG. 23 is a view illustrating a method of determining whether a horizontal binary split (SPLIT_BT_HOR) is allowed for a current block by a decoding apparatus according to an embodiment.

FIG. 23 is a view illustrating a method of determining whether horizontal binary splitting (SPLIT_BT_HOR) is allowed for a current block by a decoding apparatus. The decoding apparatus according to an embodiment may determine whether a current block is a chroma block (S2310). The decoding apparatus may check a value of a cIdx parameter specifying a color component of the current block to determine whether the current block is a chroma block, as described above.

Next, the decoding apparatus according to an embodiment may determine whether the height of the current block is equal to or less than a length of 4 samples (S2320). The decoding apparatus may determine that the height of the current block is equal to or less than 4, when the value of a parameter specifying the height of the current block is equal to or less than 4. Alternatively, the decoding apparatus may perform step S2320 based on whether the height of the luma block is equal to or less than 4 or 8 according to the color format of the current block, as described above. For example, when the color format of the current block is 4:4:4 or 4:2:2, the decoding apparatus may perform step S2320 by determining whether the height of the luma block is equal to or less than 4. Similarly, when the color format of the current block is 4:2:2, the decoding apparatus may perform step S2320 by determining whether the height of the luma block is equal to or less than 8.

Finally, when the current block is a chroma block and the height is equal to or less than 4, the decoding apparatus may determine that horizontal binary splitting is not allowed for the current block (S2330).

Meanwhile, when the above conditions are not satisfied, the decoding apparatus may determine that horizontal binary splitting is allowed for the current block. In this case, the decoding apparatus may determine whether horizontal binary splitting is allowed for the current block (S2340), by determining an additional condition that horizontal binary splitting is not allowed for the current block, as described above. For example, the decoding apparatus may determine that horizontal binary splitting is not allowed for the current block when the number of times of splitting the current block from a quadtree leaf node is equal to or greater than a value of MaxMttDepth which is a parameter specifying a maximum allowed hierarchy depth of a multitype tree split from the quadtree leaf node, and determine that horizontal binary splitting is allowed for the current block when the number of times of splitting the current block is less than the value of MaxMttDepth.

Embodiment 4

As described above, the minimum width or height of the chroma block needs to be limited to a length of four pixels. Hereinafter, a method of limiting vertical binary splitting of a current block by an encoding/decoding apparatus according to an embodiment will be described with reference to FIG. 24.

Figure 24:
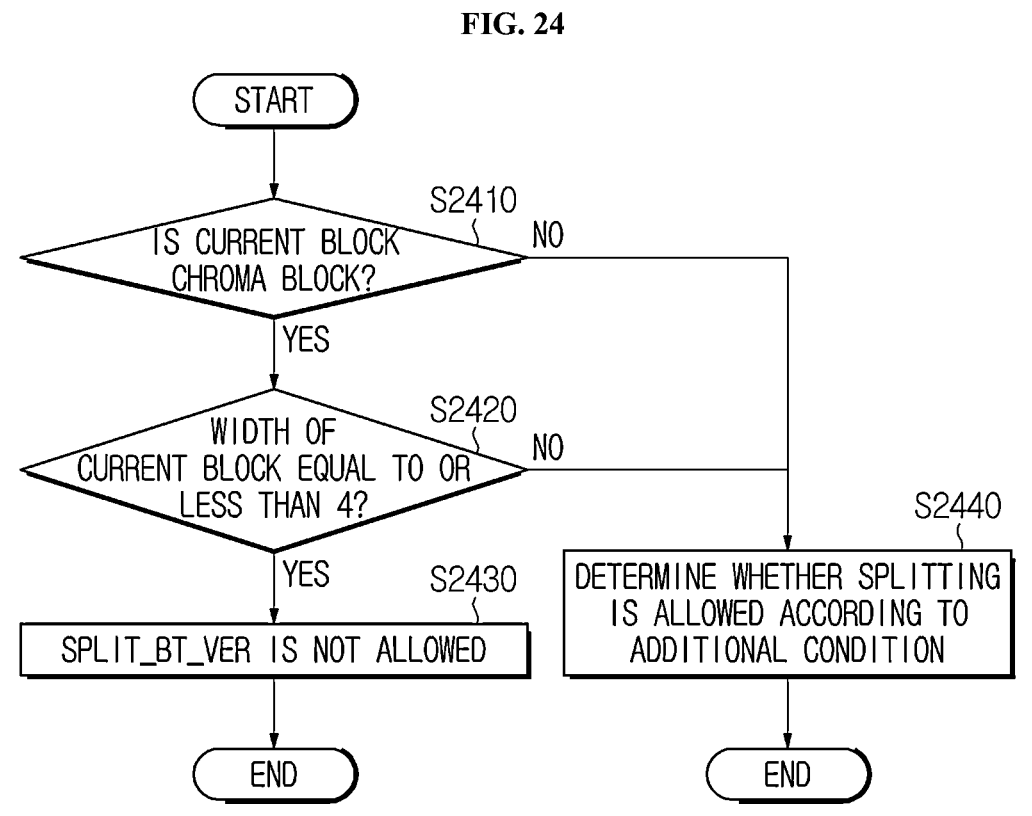

FIG. 24 is a view illustrating a method of determining whether vertical binary splitting (SPLIT_BT_VER) is allowed for a current block by a decoding apparatus. The decoding apparatus according to an embodiment may determine whether a current block is a chroma block (S2410). The decoding apparatus may check a value of a cIdx parameter specifying a color component of the current block to determine whether the current block is a chroma block, as described above.

Next, the decoding apparatus according to an embodiment may determine whether the width of the current block is equal to or less than a length of 4 samples (S2420). The decoding apparatus may determine that the width of the current block is equal to or less than 4, when the value of a parameter specifying the width of the current block is equal to or less than 4. Alternatively, the decoding apparatus may perform step S2420 based on whether the width of the luma block is equal to or less than 4 or 8 according to the color format of the current block, as described above. For example, when the color format of the current block is 4:4:4, the decoding apparatus may perform step S2420 by determining whether the width of the luma block is equal to or less than 4. Similarly, when the color format of the current block is 4:2:2 or 4:2:0, the decoding apparatus may perform step S2420 by determining whether the width of the luma block is equal to or less than 8.

Finally, when the current block is a chroma block and the width is equal to or less than 4, the decoding apparatus may determine that vertical binary splitting is not allowed for the current block (S2430).

Meanwhile, when the above conditions are not satisfied, the decoding apparatus may determine that vertical binary splitting is allowed for the current block. In this case, the decoding apparatus may determine whether vertical binary splitting is allowed for the current block (S2440), by determining an additional condition that vertical binary splitting is not allowed for the current block, as described above. For example, the decoding apparatus may determine that vertical binary splitting is not allowed for the current block when the number of times of splitting the current block from a quadtree leaf node is equal to or greater than a value of MaxMttDepth which is a parameter specifying a maximum allowed hierarchy depth of a multitype tree split from the quadtree leaf node, and determine that vertical binary splitting is allowed for the current block when the number of times of splitting the current block is less than the value of MaxMttDepth.

Embodiment 5

As described above, in order to reduce encoding and decoding complexity, encoding and decoding need to be performed by limiting the minimum height and width of the chroma block to a length of four samples. In this case, when the color format is 4:2:2 or 4:2:0, the minimum allowed size of the luma block may be determined as 8.

When the IBC mode is performed in the case of a dual tree in which a luma block and a chroma block in a CTU are split into individual block tree structures, motion information of the chroma block may be derived as a value of motion information of the luma block. Here, the motion information may be a motion vector. In this case, by chanting an allowed minimum size of the chroma block, the coordinates of a luma subblock which shall be referenced by a chroma subblock may be changed.

Figure 25:
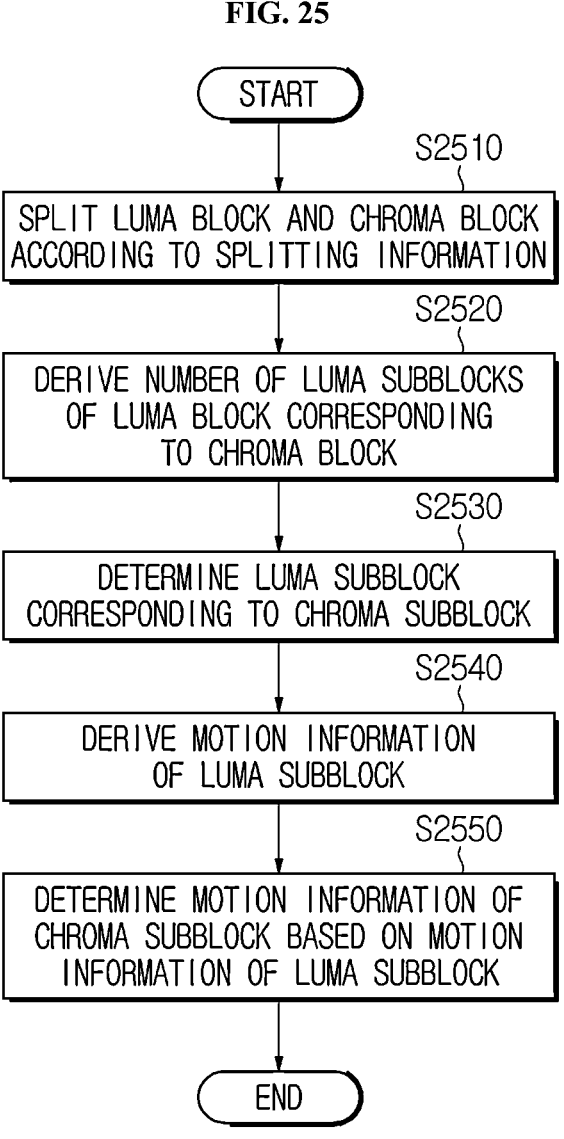
FIG. 25 is a view illustrating a method of deriving motion information of a chroma subblock using motion information of a luma subblock by a decoding apparatus according to an embodiment.

FIG. 25 is a view illustrating a method of deriving motion information of a chroma subblock using motion information of a luma subblock by a decoding apparatus according to an embodiment. A method of deriving motion information of a chroma subblock using motion information of an 8×8 luma subblock corresponding to a 4×4 chroma subblock by a decoding apparatus will be described with reference to FIG. 25.

The decoding apparatus according to an embodiment may split the luma block of a CTU according to splitting information of the luma block based on a dual tree. In addition, the decoding apparatus according to an embodiment may split a chroma cb block and cr block according to the splitting information of the chroma block based on the dual tree (S2510).

Next, the decoding apparatus may derive the number of luma subblocks configuring the luma block, for the luma block corresponding to the chroma block (S2520). The decoding apparatus may calculate the number of columns of the luma subblock by dividing the width of the luma block by 8 or performing right shift operation three times with respect to a 2-bit value specifying the width of the luma block, and store it in a numSbX parameter. In the same way, the decoding apparatus may calculate the number of rows of the luma subblock by dividing the height of the luma block by 8 or performing right shift operation three times with respect to a 2-bit value specifying the height of the luma block, and store it in a numSbY parameter. These equations are as follows. Here, cbWidth may be a parameter expressing the width of the luma block in units of pixels and cbHeight may be a parameter expressing the height of the luma block in units of pixels.

$$numbSbX = (cbWidth >> 3) \qquad \text{[Equation 2]}$$

$$numbSbX = (cbHeight >> 3) \qquad \text{[Equation 3]}$$

Next, the decoding apparatus may determine a luma subblock corresponding to a chroma subblock (S2530). The decoding apparatus may determine the top-left sample coordinates of the luma subblock, by adding the indices (xSbIdx, ySbIdx) of the luma subblock scaled to 8, which is a minimum allowed size of the luma block, to the top-left sample coordinates of the luma block. This may be expressed by the following equations. Here, (xCuY, yCyY) represents the coordinates of the top-left sample of the luma subblock, xSbIdx represents an x-axis index of the luma subblock, and ySbIdx represents a y-axis index of the luma subblock. xSbIdx may have a value from 0 to numSbX−1, ySbIdx may have a value from 0 to numSbY−1.

$$xCuY = xCb + xSbIdx * 8 \qquad \text{[Equation 4]}$$

$$yCuY = yCb + ySbIdx * 8 \qquad \text{[Equation 5]}$$

Next, the decoding apparatus may derive the motion information of the luma subblock according to the prediction mode of the luma subblock (S2540). When the prediction mode of the luma subblock is an IBC prediction mode, the decoding apparatus may set a motion information array of the luma subblock specified by a luma subblock index using the motion information of the luma subblock. Here, mvL [xSbIdx][ySbIdx][0] represents an x component of the motion information of the luma subblock expressed by a luma subblock index (xSbIdx, ySbIdx), and mvL[xSbIdx] [ySbIdx][1] represents a y component of the motion information of the luma subblock.

$$mvL[xSbIdx][ySbIdx][0] = MvL0[xCuY][yCuY][0] \qquad \text{[Equation 6]}$$

$$mvL[xSbIdx][ySbIdx][1] = MvL0[xCuY][yCuY][1] \qquad \text{[Equation 7]}$$

Meanwhile, when the prediction mode of the luma subblock is an intra prediction mode, the decoding apparatus may set all the motion information of the luma subblock to 0. This may be expressed by the following equations.

$$mvL[xSbIdx][ySbIdx][0] = 0 \qquad \text{[Equation 8]}$$

$$mvL[xSbIdx][ySbIdx][1] = 0 \qquad \text{[Equation 9]}$$

Next, the decoding apparatus may determine the motion information of the chroma subblock based on the motion information of the luma subblock (S2550). The decoding apparatus may determine the motion information of the chroma subblock by multiplying or adding a predetermined scaling coefficient by or to the motion information of the luma subblock expressed by the luma subblock index (xS-bIdx, ySbIdx).

Encoding Method

FIG. 26 is a flowchart illustrating a method of encoding an image by a decoding apparatus according to an embodiment. Hereinafter, the encoding method of performing Embodiments 1 to 5 will be described with reference to FIG. 26.

First, the encoding apparatus may determine whether predetermined splitting is allowed for a current block based on a size of the current block (S2610). The encoding apparatus may determine whether predetermined splitting is allowed for the current block and the current block may be split into subblocks based on the width or height of the current block.

The encoding apparatus may determine whether splitting is allowed for the current block based on whether the current block satisfies a condition in which splitting by the above-described quadtree and multitree occurs. In an embodiment, the encoding apparatus may determine whether the current block is split in any one of vertical ternary splitting, horizontal ternary splitting, vertical binary splitting or horizontal binary splitting based on Embodiments 1 to 4 described above.

Next, the encoding apparatus may split the current block based on whether predetermined splitting is allowed (S2620). The encoding apparatus may encode the current block by applying the allowed splitting mode among the above-described quadtree and multitree splitting modes, and calculate RD cost according to each splitting mode. The encoding apparatus may determine a splitting mode applying to the current block according to the RD cost determined according to each splitting mode. For example, the encoding apparatus may determine that the horizontal ternary mode applies as the splitting mode of the current block, when splitting of the horizontal ternary mode is allowed for the current block and best RD cost is calculated when the current block is split and encoded in the corresponding mode.

Next, the encoding apparatus may encode information on splitting of the current block and encode the current block, based on whether predetermined splitting is allowed (S2630). The encoding apparatus may encode information on splitting of the current block, in order to specify the splitting mode of the current block.

In an embodiment, the encoding apparatus may specify whether the current block is split into a quadtree structure using qt_split_flag as described above. The encoding apparatus may set qt_split_flag to a first value (e.g., 1) and perform encoding, when the current block is split into a quadtree. The encoding apparatus may set qt_split_flag to a second value (e.g., 0) and perform encoding, when the current block is not split into a quadtree.

In this embodiment, when the current block is split into a quadtree but is split into a multitree, the encoding apparatus may specify whether the current block is split into a multitree using mtt_split_cu_flag which is multitree splitting information.

When the current block is split into a multitree, the encoding apparatus may set mtt_split_cu_flag to a first value (e.g., 1) and perform encoding. When the current block is not split into a multitree, the encoding apparatus may set mtt_split_cu_flag to a second value (e.g., 0) and perform encoding.

In addition, the encoding apparatus may encode mtt_split_cu_vertical_flag and mtt_split_cu_binary_flag to specify the multitree splitting type and multitree splitting direction of the current block. For example, mtt_split_cu_vertical_flag may be set to a first value (e.g., 0) when the current block is split in a horizontal direction and set to a second value (e.g., 1) when the current block is split in a vertical direction. mtt_split_cu_binary_flag may be set to a first value (e.g., 0) when the current block is split into a ternary tree and set to a second value (e.g., 1) when the current block is split into a binary tree.

Meanwhile, in another embodiment, as shown in FIG. 27, the encoding apparatus may encode information on splitting of the current block, by encoding split_cu_flag (2710) which is splitting information specifying whether the current block is split, split_qt_flag (2720) which is quadtree splitting information specifying whether quadtree splitting of the current block is performed, mtt_split_cu_vertical_flag (2730) which is splitting direction information specifying the splitting direction of the current block in a multitree structure and mtt_split_cu_binary_flag (2740) which is splitting type information specifying whether the splitting type of the current block is a binary splitting type or ternary splitting type in the multitree structure.

As described above, split_cu_flag (2710) may be set to a first value (e.g., 0) when the current block is not split and may be set to a second value (e.g., 1) when the current block is split into subblocks. split_qt_flag (2720) may be set to a first value (e.g., 0) when the current block is split into a quadtree and may be set to a second value (e.g., 1) when the current block is not split into a quadtree but is split into a multitree. mtt_split_cu_vertical_flag (2730) may be set to a first value (e.g., 0) when the current block is split in a horizontal direction and may be set to a second value (e.g., 1) when the current block is split in a vertical direction. mtt_split_cu_binary_flag (2740) may be set to a first value (e.g., 0) when the current block is split into a ternary tree and may be set to a second value (e.g., 1) when the current block is split into a binary tree.

The encoding apparatus may encode information on splitting of the current block based on whether predetermined splitting is allowed for the current block. For example, the encoding apparatus may not encode split_cu_flag when both quadtree splitting and multitree splitting are allowed for the current block. In this case, the decoding apparatus may derive split_cu_flag to a predetermined value.

In addition, the encoding apparatus may not encode qt_split_flag when quadtree splitting is allowed but multitree splitting is not allowed for the current block. In this case, the decoding apparatus may derive qt_split_flag to a predetermined value.

In addition, when qt_split_flag specifies that quadtree splitting is performed, horizontal binary splitting and horizontal ternary splitting are not allowed for the current block or vertical binary splitting and vertical ternary splitting are not allowed, the encoding apparatus may not encode mtt_split_cu_vertical_flag. In this case, the decoding apparatus may derive mtt_split_cu_vertical_flag to a predetermined value.

In addition, when qt_split_flag specifies that quadtree splitting is performed, or vertical binary splitting or vertical ternary splitting is not allowed for the current block, or mtt_split_cu_vertical_flag specifies horizontal splitting and horizontal binary splitting or horizontal ternary splitting is not allowed for the current block or mtt_split_cu_vertical_flag specifies vertical splitting, the encoding apparatus may not encode mtt_split_cu_binary_flag. In this case, the decoding apparatus may derive mtt_split_cu_binary_flag to a predetermined value.

In addition, the encoding apparatus may encode the current block using a subblock obtained by splitting the current block. The encoding apparatus may generate prediction information by performing the above-described intra/inter/IBC prediction based on the subblock, generate residual information according to a result of prediction, and encode the current block by encoding the prediction information and the residual information.

In an embodiment, the encoding apparatus may derive the motion vector of the chroma block from the luma block, by applying Embodiment 5 described above, when the chroma block is encoded by performing IBC prediction.

Bitstream

A method of generating a bitstream by an encoding apparatus will be described in greater detail with reference to FIG. 27. The encoding apparatus may determine whether the current block is split based on Embodiments 1 to 4 described above. More specifically, the encoding apparatus may determine a value of a parameter allowSplitTtVer specifying whether vertical ternary splitting is allowed for the current block, determine the value as a first value (e.g., 1) when splitting is allowed, and determine the value as a second value (e.g., 0) when splitting is not allowed.

In addition, the encoding apparatus may determine a value of a parameter allowSplitTtHor specifying whether horizontal ternary splitting is allowed for the current block, determine the value as a first value (e.g., 1) when splitting is allowed, and determine the value as a second value (e.g., 0) when splitting is not allowed.

In addition, the encoding apparatus may determine a value of a parameter allowSplitBtVer specifying whether vertical binary splitting is allowed for the current block, determine the value as a first value (e.g., 1) when splitting is allowed, and determine the value as a second value (e.g., 0) when splitting is not allowed.

In addition, the encoding apparatus may determine a value of a parameter allowSplitBtHor specifying whether horizontal binary splitting is allowed for the current block, determine the value as a first value (e.g., 1) when splitting is allowed, and determine the value as a second value (e.g., 0) when splitting is not allowed.

According to the determination, the encoding apparatus may determine whether at least one of split_cu_flag (2710), qt_split_flag (2720), mtt_split_cu_vertical_flag (2730) or mtt_split_cu_binary_flag (2740) which is splitting information of the current block is output as a bitstream, as described above with reference to FIG. 27.

General Decoding Apparatus

FIG. 28 is a flowchart illustrating a method of decoding an image by a decoding apparatus according to an embodiment. Hereinafter, the decoding method for performing Embodiments 1 to 5 described above will be described with reference to FIG. 28.

First, the decoding apparatus may determine whether predetermined splitting is allowed for a current block based on a size of the current block (S2810). The decoding apparatus may determine whether predetermine splitting is allowed for the current block based on a width or height of the current block. The decoding apparatus may determine a predetermined splitting mode allowed for the current block based on whether the current block satisfies a condition in which the above-described quadtree and multitree splitting may occur. In this case, the current block may be a chroma block split into a dual tree splitting structure.

In an embodiment, the decoding apparatus may determine whether any one of vertical ternary splitting, horizontal ternary splitting, vertical binary splitting and horizontal binary splitting is allowed for the current block based on Embodiments 1 to 4 described above.

For example, the decoding apparatus may determine that vertical ternary splitting is not allowed for the current block, when the current block is a chroma block and a width is equal to or less than a length of 8 samples. In addition, the decoding apparatus may determine that horizontal ternary splitting is not allowed for the current block, when the current block is a chroma block and a height is equal to or less than a length of 8 samples.

In addition, the decoding apparatus may determine that vertical binary splitting is not allowed for the current block, when the current block is a chroma block and a width is equal to or less than a length of 4 samples. In addition, the decoding apparatus may determine that horizontal binary splitting is not allowed for the current block, when the current block is a chroma block and a height is equal to or less than a length of 4 samples.

In an embodiment, the width or height of the chroma block may be derived based on the width or height of the luma bock corresponding to the chroma block and a color format, as described above. More specifically, the width or height of the chroma block may be derived by dividing the width or height of the corresponding luma block by a component ratio between a chroma sample and a luma sample derived based on the color format. Here, the component ratio between the chroma sample and the luma sample may be calculated for the width and the height. In the case of a 4:4:4 color format, the component ratio between the chroma sample and the luma sample may be 1:1 for both the width and the height. Accordingly, the width or height of the chroma block may be derived as a value obtained by dividing the width or height of the corresponding luma block by 1.

In addition, in the case of a 4:2:2 color format, the width component ratio between the chroma sample and the luma sample may be 1:2 and the height component ratio between the chroma sample and the luma sample may be 1:1. Accordingly, the width of the chroma block may be derived as a value obtained by dividing the width of the corresponding luma block by 2, and the height of the chroma block may be derived as a value obtained by dividing the height of the luma block by 1. In addition, in the case of a 4:2:0 color format, both the width and height component ratio between the chroma sample and the luma sample may be 1:2. Accordingly, the width or height of the chroma block may be derived as a value obtained by dividing the width or height of the luma block by 2.

Next, the decoding apparatus may obtain information on splitting of the current block based on whether predetermined splitting is allowed (S2820). As described above with reference to FIG. 27, the decoding apparatus may obtain, from a bitstream, at least one of split_cu_flag (2710), split_qt_flag (2720), mtt_split_cu_vertical_flag (2730) or mtt_split_cu_binary_flag (2740) which is the information on splitting of the current block, by parsing the bitstream when predetermined splitting is allowed.

Meanwhile, the decoding apparatus may determine the information on splitting of the current block as a value specifying splitting other than the predetermined splitting when predetermined splitting is not allowed. For example, when predetermined splitting is not allowed, the information on splitting of the current block may be derived as a predetermined value without being obtained from the bitstream. For example, split_cu_flag specifying whether splitting is performed may be derived as 0.

In an embodiment, split_qt_flag specifying whether quadtree splitting is performed may be derived as 1 when a value of split_cu_flag is 1 and all of vertical ternary splitting, horizontal ternary splitting, vertical binary splitting and horizontal binary splitting are not allowed for the current block based on Embodiments 1 to 4 described above and, otherwise, may be derived as 0.

mtt_split_cu_vertical_flag which is splitting direction information may be derived as 0 when horizontal ternary splitting or horizontal binary splitting is allowed for the current block and, otherwise, may be derived as 1.

mtt_split_cu_binary_flag which is splitting type information may be derived as 0 when vertical binary splitting and horizontal binary splitting are not allowed for the current block and may be derived as 1 when vertical ternary splitting and horizontal ternary splitting are not allowed for the current block, may be derived as a value of 1−mtt_split_cu_vertical_flag when horizontal binary splitting and vertical ternary splitting are allowed for the current block, and may be derived as a value of mtt_split_cu_vertical_flag when vertical binary splitting and horizontal ternary splitting are allowed for the current block.

Next, the decoding apparatus may split the current block based on the information on splitting of the current block (S2830). As described above, the decoding apparatus may determine the splitting mode of the current block as a splitting mode corresponding to any one of the quadtree or the multitree based on split_qt_flag (2720), mtt_split_cu_vertical_flag (2730) and mtt_split_cu_binary_flag (2740) and Table 1. In addition, the decoding apparatus may split the current block in the determined splitting mode.

Next, the decoding apparatus may decode an image by decoding the current block and generating a reconstructed block based on the splitting mode of the current block (S2840). For example, the decoding apparatus may decode the image using a subblock obtained by dividing the current block. The decoding apparatus may decode the image by performing the above-described intra/inter/IBC prediction based on the subblock. In an embodiment, the decoding apparatus may derive the motion vector of the chroma block from the luma block by applying Embodiment 5 described above, when prediction of the chroma block is performed by performing IBC prediction.

Application Embodiment

While the exemplary methods of the present disclosure described above are represented as a series of operations for clarity of description, it is not intended to limit the order in which the steps are performed, and the steps may be performed simultaneously or in different order as necessary. In order to implement the method according to the present disclosure, the described steps may further include other steps, may include remaining steps except for some of the steps, or may include other additional steps except for some steps.

In the present disclosure, the image encoding apparatus or the image decoding apparatus that performs a predetermined operation (step) may perform an operation (step) of confirming an execution condition or situation of the corresponding operation (step). For example, if it is described that predetermined operation is performed when a predetermined condition is satisfied, the image encoding apparatus or the image decoding apparatus may perform the predetermined operation after determining whether the predetermined condition is satisfied.

The various embodiments of the present disclosure are not a list of all possible combinations and are intended to describe representative aspects of the present disclosure, and the matters described in the various embodiments may be applied independently or in combination of two or more.

Various embodiments of the present disclosure may be implemented in hardware, firmware, software, or a combination thereof. In the case of implementing the present disclosure by hardware, the present disclosure can be implemented with application specific integrated circuits (ASICs), Digital signal processors (DSPs), digital signal processing devices (DSPDs), programmable logic devices (PLDs), field programmable gate arrays (FPGAs), general processors, controllers, microcontrollers, microprocessors, etc.

In addition, the image decoding apparatus and the image encoding apparatus, to which the embodiments of the present disclosure are applied, may be included in a multimedia broadcasting transmission and reception device, a mobile communication terminal, a home cinema video device, a digital cinema video device, a surveillance camera, a video chat device, a real time communication device such as video communication, a mobile streaming device, a storage medium, a camcorder, a video on demand (VoD) service providing device, an OTT video (over the top video) device, an Internet streaming service providing device, a three-dimensional (3D) video device, a video telephony video device, a medical video device, and the like, and may be used to process video signals or data signals. For example, the OTT video devices may include a game console, a blu-ray player, an Internet access TV, a home theater system, a smartphone, a tablet PC, a digital video recorder (DVR), or the like.

Figure 29:
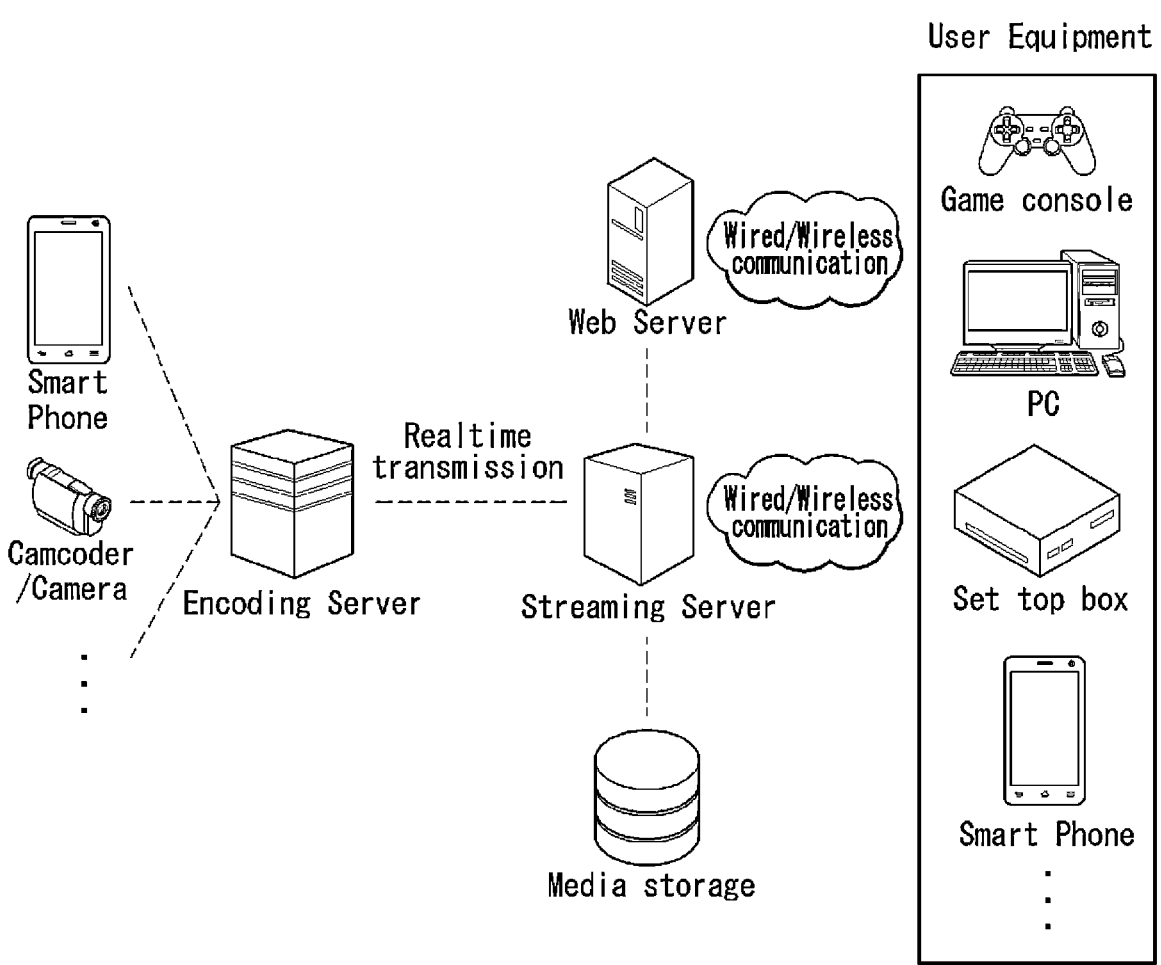
FIG. 29 is a view showing a content streaming system, to which an embodiment of the present disclosure is applicable.

FIG. 29 is a view showing a contents streaming system, to which an embodiment of the present disclosure is applicable.

As shown in FIG. 29, the contents streaming system, to which the embodiment of the present disclosure is applied, may largely include an encoding server, a streaming server, a web server, a media storage, a user device, and a multimedia input device.

The encoding server compresses contents input from multimedia input devices such as a smartphone, a camera, a camcorder, etc. into digital data to generate a bitstream and transmits the bitstream to the streaming server. As another example, when the multimedia input devices such as smartphones, cameras, camcorders, etc. directly generate a bitstream, the encoding server may be omitted.

The bitstream may be generated by an image encoding method or an image encoding apparatus, to which the embodiment of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server may deliver it to a streaming server, and the streaming server may transmit multimedia data to the user. In this case, the contents streaming system may include a separate control server. In this case, the control server serves to control a command/response between devices in the contents streaming system.

The streaming server may receive contents from a media storage and/or an encoding server. For example, when the contents are received from the encoding server, the contents may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (e.g., smartwatches, smart glasses, head mounted displays), digital TVs, desktops computer, digital signage, and the like.

Each server in the contents streaming system may be operated as a distributed server, in which case data received from each server may be distributed.

The scope of the disclosure includes software or machine-executable commands (e.g., an operating system, an application, firmware, a program, etc.) for enabling operations according to the methods of various embodiments to be executed on an apparatus or a computer, a non-transitory computer-readable medium having such software or commands stored thereon and executable on the apparatus or the computer.

INDUSTRIAL APPLICABILITY

The embodiments of the present disclosure may be used to encode or decode an image.

The invention claimed is:

1. An image decoding method performed by an image decoding apparatus, the image decoding method comprising:

obtaining information on splitting of a current block from a bitstream;

splitting the current block based on the information on splitting of the current block;

decoding the current block; and wherein the information on splitting of the current block comprises at least one of a splitting direction or a splitting type, wherein, based on the current block being a chroma block, a tree structure of the current chroma block being a dual tree structure and a width of the current block being equal to 8, vertical ternary splitting is not allowed for the current block regardless of a height of block(s) being derived from the current block by the vertical ternary splitting.

2. The image decoding method of claim 1, wherein, based on the current block being a chroma block and the width of the current block being equal to 4, vertical binary splitting is not allowed for the current block.

3. The image decoding method of claim 1, wherein, based on predetermined splitting being not allowed for the current block, the information on splitting of the current block is determined as a value specifying splitting other than the predetermined splitting.

4. The image decoding method of claim 3, wherein the information on splitting of the current block includes splitting type information specifying ternary splitting or binary splitting, wherein, based on vertical ternary splitting and horizontal ternary splitting being not allowed for the current block, the splitting type information is determined as a value specifying binary splitting, and wherein, based on vertical binary splitting and horizontal binary splitting being not allowed for the current block, the splitting type information is determined as a value specifying ternary splitting.

5. The image decoding method of claim 3, wherein the information on splitting of the current block includes splitting direction information specifying vertical splitting or horizontal splitting, wherein, based on vertical binary splitting and vertical ternary splitting being not allowed for the current block and horizontal binary splitting or horizontal ternary splitting are allowed, the splitting direction information is determined as a value specifying horizontal splitting, and wherein, based on horizontal binary splitting and horizontal ternary splitting being not allowed for the current block and vertical binary splitting or vertical ternary splitting are allowed, the splitting direction information is determined as a value specifying vertical splitting.

6. The image decoding method of claim 1, further comprising:

based on the current block being a chroma block predicted in an IBC (intra block copy) mode, splitting a luma block corresponding to the current block into luma subblocks each having a predetermined size;

obtaining motion information of the luma subblocks;

deriving motion information of subblocks in the current block corresponding to the luma subblocks based on the motion information of the luma subblocks; and performing IBC prediction on the current block based on the derived motion information, wherein the predetermined size of each of the luma subblocks is 8×8.

7. An image encoding method performed by an image encoding apparatus, the image encoding method comprising:

splitting a current block based on whether predetermined splitting is allowed for the current block;

encoding information on splitting of the current block; and encoding the current block, wherein the information on splitting of the current block comprises at least one of a splitting direction or a splitting type, wherein, based on the current block being a chroma block, a tree structure of the current chroma block being a dual tree structure and a width of the current block being equal to 8, vertical ternary splitting is not allowed for the current block regardless of a height of block(s) being derived from the current block by the vertical ternary splitting.

8. The image encoding method of claim 7, wherein, based on the current block being a chroma block and the width of the current block being equal to 4, vertical binary splitting is not allowed for the current block.

9. A method of transmitting a bitstream comprising:

transmitting a bitstream generated by an image encoding method;

wherein the image encoding method comprises, splitting a current block based on whether predetermined splitting is allowed for the current block;

encoding information on splitting of the current block into the bitstream; and encoding the current block into the bitstream, wherein the information on splitting of the current block comprises at least one of a splitting direction or a splitting type, wherein, based on the current block being a chroma block, a tree structure of the current chroma block being a dual tree structure and a width of the current block being equal to 8, vertical ternary splitting is not allowed for the current block regardless of a height of block(s) being derived from the current block by the vertical ternary splitting.

10. An image decoding apparatus comprising:

at least one processor; and at least one memory including program code, the at least one memory and the program code configured to, with the at least one processor cause the apparatus at least to perform:

obtaining information on splitting of a current block from a bitstream;

splitting the current block based on the information on splitting of the current block;

decoding the current block; and wherein the information on splitting of the current block comprises at least one of a splitting direction or a splitting type, wherein, based on the current block being a chroma block, a tree structure of the current chroma block being a dual tree structure and a width of the current block being equal to 8, vertical ternary splitting is not allowed for the current block regardless of a height of block(s) being derived from the current block by the vertical ternary splitting.

11. An image encoding apparatus comprising:

at least one processor; and at least one memory including program code, the at least one memory and the program code configured to, with the at least one processor cause the apparatus at least to perform:

splitting a current block based on whether predetermined splitting is allowed for the current block;

encoding information on splitting of the current block; and encoding the current block, wherein the information on splitting of the current block comprises at least one of a splitting direction or a splitting type, wherein, based on the current block being a chroma block, a tree structure of the current chroma block being a dual tree structure and a width of the current block being equal to 8, vertical ternary splitting is not allowed for the current block regardless of a height of block(s) being derived from the current block by the vertical ternary splitting.

12. An apparatus comprising:

at least one processor; and at least one memory including program code, the at least one memory and the program code configured to, with the at least one processor cause the apparatus at least to perform:

transmitting a bitstream generated by an image encoding method;

wherein the image encoding method comprises, splitting a current block based on whether predetermined splitting is allowed for the current block;

encoding information on splitting of the current block into the bitstream; and encoding the current block into the bitstream, wherein the information on splitting of the current block comprises at least one of a splitting direction or a splitting type, wherein, based on the current block being a chroma block, a tree structure of the current chroma block being a dual tree structure and a width of the current block being equal to 8, vertical ternary splitting is not allowed for the current block regardless of a height of block(s) being derived from the current block by the vertical ternary splitting.

* * * * *